United States Patent [19]

Kurashita et al.

[11] Patent Number: 5,502,509
[45] Date of Patent: Mar. 26, 1996

[54] CHROMINANCE-LUMINANCE SEPARATION METHOD AND FILTER PERFORMING SELECTIVE SPATIAL FILTER BASED ON DETECTED SPATIAL CORRELATION

[75] Inventors: Takuji Kurashita; Noriyuki Yamaguchi; Mitsuru Ishizuka; Junko Kijima; Hitoshi Hasegawa; Masaharu Yao, all of Nagaokakyo, Japan

[73] Assignee: Mitsubishi Denki Kabushiki Kaisha, Tokyo, Japan

[21] Appl. No.: 263,198

[22] Filed: Jun. 21, 1994

[30] Foreign Application Priority Data

Jun. 21, 1993 [JP] Japan .................................. 5-174970
Jul. 6, 1993 [JP] Japan .................................. 5-192879
Mar. 22, 1994 [JP] Japan .................................. 6-076606

[51] Int. Cl.$^6$ ............................................. H04N 9/78
[52] U.S. Cl. ................................... 348/669; 348/663
[58] Field of Search .................................. 348/663, 664, 348/665, 666, 667, 668, 669, 670; H04N 9/78

[56] References Cited

U.S. PATENT DOCUMENTS 4,754,322   6/1988   Okuda et al. ........................ 348/669
4,982,271   1/1991   Sugiyama et al. ................... 348/669
5,345,276   9/1994   Hong ................................... 348/663

OTHER PUBLICATIONS

CBS Technology Center, "Digital TV Comb Filter With Adaptive Features," John P. Rossi, pp. 267–282, 1976.
Journal of the SMPTE, "Digital Television Image Enhancement," vol. 84, Jul. 1975, Rossi.

*Primary Examiner*—James J. Groody
*Assistant Examiner*—Nate Flynn

[57] ABSTRACT

Motion-adaptive chrominance-luminance separation of a composite video signal is accomplished by comb-filtering the video signal on the time axis, bandpass-filtering the video signal on at least one spatial axis selected according to spatial correlation detected in the video signal, and combining the two filtered results in proportion to motion detected in the video signal. Motion is detected in part by obtaining a one-frame difference signal that has been filtered to eliminate chrominance information; here too the filtering is performed on at least one spatial axis selected according to spatial correlation. Selecting the spatial filtering axes according to spatial correlation enables chrominance and luminance to be separated effectively without unnecessary information loss.

52 Claims, 14 Drawing Sheets

FIG.12.B

CHROMINANCE-LUMINANCE SEPARATION METHOD AND FILTER PERFORMING SELECTIVE SPATIAL FILTER BASED ON DETECTED SPATIAL CORRELATION

BACKGROUND OF THE INVENTION

This invention relates to a method and filter for separating chrominance and luminance signals from a composite video signal, such as the signal specified by the National Television System Committee (NTSC), in which the chrominance signal is superimposed on a high-frequency region of the luminance signal.

In recent years chrominance-luminance separation has been markedly improved by the use of multi-dimensional digital filtering. One conventional system, for example, employs a two-dimensional comb filter for filtering spatial frequencies on the horizontal and vertical axes, and a frame comb filter for filtering the signal on the time axis. The outputs of these filters are mixed in proportion to the degree of motion in the picture, so that increasing motion leads to increasing use of the output of the two-dimensional comb filter.

By exploiting the frame-to-frame phase reversal of the color subcarrier signal, in a still picture the frame comb filter achieves complete chrominance-luminance separation. If the picture is moving, however, the frame comb filter creates unwanted artifacts such as double images. The two-dimensional spatial comb filter avoids these artifacts but produces others, such as cross color (luminance crosstalk into the chrominance signal) and dot crawl, which can be particularly noticeable at the edges of objects. Overall, the frame comb filter works better for stationary parts of the picture, while the two-dimensional spatial comb filter works better for moving parts, and this is the reason for selecting the outputs of the two filters in proportion to motion.

To detect the degree of motion, the conventional system compares the video signal in different frames. More specifically, a motion detector takes the difference between the signal in two consecutive frames, passes this difference through a low-pass filter to remove high-frequency components due to the above-mentioned color phase reversal, and takes the absolute value of the result. As a result, the motion in the low-frequency luminance signals is detected. To detect chrominance motion and high-frequency luminance motion, the conventional motion detector also takes the absolute value of the difference between the signal input in one frame and the signal input two frame previously. The motion can be detected by selecting the larger of the two absolute values.

One problem with this conventional system is that the low-pass filter in the motion detector fails to reject high-frequency components of the chrominance signals having a horizontal frequency distribution extending to a large extent, in the low-frequency region of the luminance signal, causing such low-frequency components to be mistakenly interpreted as motion.

Another problem is that, since the low-pass filter rejects all high-frequency components, the conventional motion detector fails to detect motion restricted to high-frequency components of the luminance signal over a one-frame interval.

A more basic problem is that the conventional system produces a very clean image, with complete chrominance-luminance separation, in stationary parts of the picture, but allows considerable dot crawl and cross color in moving parts. The striking difference in quality between different parts of the same picture creates an odd impression.

SUMMARY OF THE INVENTION

It is accordingly an object of the present invention to reduce cross color and dot crawl in the output of a two-dimensional spatial filter.

Yet another object of the invention is to prevent the incorrect detection of high-frequency components of the chrominance signal in the low spatial frequency region of the luminance signal as luminance motion information.

Still another object of the invention is to enable the detection of motion restricted to high-frequency components of the luminance signal over a one-frame interval.

The invented method of separating a chrominance signal from a luminance signal in a composite video signal in which said chrominance signal is superimposed on a high-frequency region of said luminance signal, comprises the steps of:

detecting spatial correlation of said composite video signal;

bandpass-filtering said composite video signal on at least one spatial axis selected according to said spatial correlation, thereby obtaining a first chrominance signal;

comb-filtering said composite video signal on a time axis to obtain a second chrominance signal;

detecting a degree of motion in said composite video signal; and mixing said first chrominance signal and said second chrominance signal in proportion to said degree of motion to obtain an output chrominance signal.

The invented motion-adaptive chrominance-luminance separation filter for separating a chrominance signal from a luminance signal in a composite video signal in which the chrominance signal is superimposed on a high-frequency region of the luminance signal, comprises:

at least two 1H delay means coupled in series, for delaying said composite video signal by one horizontal scan period each, thereby generating a first plurality of signals with various delays;

at least two 1F delay means coupled in series, for delaying said composite video signal by one frame period each, thereby generating a second plurality of signals with various delays;

a two-dimensional adaptive filter coupled to receive said first plurality of signals, for detecting spatial correlation of said composite video signal and bandpass-filtering said composite video signal on at least one spatial axis selected according to said spatial correlation, thereby generating a first chrominance signal;

a frame comb filter coupled to receive at least two signals of said second plurality of signals, for comb-filtering said composite video signal on a time axis to obtain a second chrominance signal;

a motion detector coupled to receive at least two signals of said second plurality of signals, for detecting a degree of motion in said composite video signal and generating a motion signal; and a mixer coupled to mix said first chrominance signal and said second chrominance signal according to said motion signal, thereby generating an output chrominance signal.

With the above arrangement, the first chrominance signal obtained by bandpass-filtering the composite video signal on at least one spatial axis selected (or selecting one of the filtered outputs) according to the spatial correlation of the composite video signal so that optimum filtering is accomplished even for the moving part of the picture, and cross color and dot crawl can be reduced.

The motion-adaptive chrominance-luminance separation filter may further comprises a subtractor for subtracting said output chrominance signal from said composite video signal, thereby generating an output luminance signal.

With the above arrangement, the luminance signal accurately separated from the chrominance signal can be obtained.

The motion-adaptive chrominance-luminance separation filter may further comprise:

- a first subtractor coupled to subtract said first chrominance signal from said composite video signal, thereby generating a first luminance signal;
- a second subtractor for subtracting said second chrominance signal from said composite video signal, thereby generating a second luminance signal; and
- a mixer coupled to mix said first luminance signal and said second luminance signal according to said motion signal, thereby generating an output luminance signal.

With the above arrangement, a luminance signal accurately separated from the chrominance signal can be obtained. Moreover, it is possible to determine the condition for extracting the luminance signal independently of the condition for extracting the chrominance signal.

The motion-adaptive chrominance-luminance separation filter may further comprise:

- a first bandpass filter coupled to filter said first chrominance signal on a certain spatial axis, with a narrower passband than employed on said certain spatial axis in said two-dimensional adaptive filter; and
- a first switch coupled to insert said first bandpass filter in series between said two-dimensional adaptive filter and said mixer responsive to said spatial correlation.

With the above arrangement, the high-frequency luminance component can be removed more effectively so that the crosstalk of the luminance signal into the chrominance signal can be restrained.

The two-dimensional adaptive filter in the motion-adaptive chrominance-luminance separation filter may comprise:

- a second bandpass filter for filtering said composite video signal on a horizontal axis;
- a third bandpass filter for filtering said composite video signal on a vertical axis;
- a fourth bandpass filter for filtering said composite video signal on both said horizontal axis and said vertical axis;
- a first correlator for detecting whether horizontal correlation and vertical correlation of said composite video signal are strong or weak; and
- a second switch coupled to select an output of said second bandpass filter when said first correlator detects strong horizontal correlation, an output of said third bandpass filter when said first correlator detects strong vertical correlation and weak horizontal correlation, and an output of said fourth bandpass filter when said first correlator detects weak horizontal and vertical correlation.

With the above arrangement, three filters for bandpass-filtering on respective axes are provided, and one of the outputs of the three filters which is optimum for the spatial correlation is selected. In this manner, the optimum signal is selected for the first chrominance signal, and the cross color and dot crawl in the chrominance-luminance separation can be further reduced. in the motion-adaptive chrominance-luminance separation filter may comprise:

- a third subtractor coupled to take a difference between two signals differing by a two-frame delay among said second plurality of signals, thereby obtaining a first difference signal;
- a first absolute-value circuit coupled to take an absolute value of said first difference signal, thereby obtaining a first absolute value;
- luminance difference signal producing means responsive to one or two of said second plurality of signals for producing a luminance difference signal, and including filter means filtering said one of said second plurality of signals or the difference of said two of said second plurality of signals on at least one spatial axis selected according to the spatial correlation of said composite video signal;
- a second absolute-value circuit coupled to take an absolute value of said luminance difference signal, thereby obtaining a second absolute value; and
- a maximum selector for selecting a larger of said first absolute value and said second absolute value.

With the above arrangement, the luminance difference signal is obtained by filtering on a spatial axis selected according to the spatial correlation of the picture, and the motion is detected according to this luminance difference signal, so that the motion can be detected more accurately.

The luminance difference signal producing means may comprise:

- a fourth subtractor coupled to take a difference between two signals differing by a one-frame delay among said second plurality of signals, thereby obtaining a second difference signal;
- a first low-pass filter coupled to filter said second difference signal on said horizontal axis;
- a second low-pass filter coupled to filter said second difference signal on said vertical axis;
- a third low-pass filter coupled to filter said second difference signal on both said horizontal axis and said vertical axis; and
- a third switch coupled to select an output of said first low-pass filter when said first correlator detects strong horizontal correlation, an output of said second low-pass filter when said first correlator detects strong vertical correlation and weak horizontal correlation, and an output of said third low-pass filter when said first correlator detects weak horizontal and vertical correlation, thereby obtaining said luminance difference signal.

With the above arrangement, the selection of the outputs of the low-pass filters in the luminance difference signal generating means is made in accordance with the output of the correlator also used for the motion detection, so that the configuration of the entire circuitry is simple.

The luminance difference signal producing means may comprise:

- a fourth subtractor coupled to take a difference between two signals differing by a one-frame delay among said second plurality of signals, thereby obtaining a second difference signal;
- a second correlator coupled to detect whether horizontal correlation and vertical correlation of said second difference signal are strong or weak;

a first low-pass filter coupled to filter said second difference signal on said horizontal axis;

a second low-pass filter coupled to filter said second difference signal on said vertical axis;

a third low-pass filter coupled to filter said second difference signal on both said horizontal axis and said vertical axis; and a third switch coupled to select an output of said first low-pass filter when said second correlator detects strong horizontal correlation, an output of said second low-pass filter when said second correlator detects strong vertical correlation and weak horizontal correlation, and an output of said third low-pass filter when said second correlator detects weak horizontal and vertical correlation, thereby obtaining said luminance difference signal.

With the above arrangement, the selection of the low-pass filters receiving the frame difference signal is made in accordance with the correlation of the same frame difference signal, so that the selection can be accomplished more appropriately.

The luminance difference signal producing means may comprise:

a fourth low-pass filter coupled to filter said one of said second plurality of signals on said horizontal axis;

a fifth low-pass filter coupled to filter said one of said second plurality of signals on said vertical axis;

a sixth low-pass filter coupled to filter said one of said second plurality of signals on both said horizontal axis and said vertical axis;

a fourth switch coupled to select an output of said fourth low-pass filter when said first correlator detects strong horizontal correlation, an output of said fifth low-pass filter when said first correlator detects strong vertical correlation and weak horizontal correlation, and an output of said sixth low-pass filter when said first correlator detects weak horizontal and vertical correlation, thereby obtaining a filtered luminance signal;

a 1 F delay means coupled to delay said filtered luminance signal by one frame interval, thereby obtaining a delayed luminance signal; and a fifth subtractor coupled to take a difference between said filtered luminance signal and said delayed luminance signal, thereby obtaining said luminance difference signal.

With the above arrangement, the selection of the outputs of the low-pass filters in the luminance difference signal generating means is made in accordance with the output of the correlator also used for the motion detection, so that the configuration of the entire circuitry is simple. Moreover, the selection of the low-pass filters receiving the composite video signal is made in accordance with the correlation of the same composite video signal, so that the selection can be accomplished more appropriately.

The luminance difference signal producing means may comprise:

a fourth subtractor coupled to take a difference between two signals differing by a one-frame delay among said second plurality of signals, thereby obtaining a second difference signal;

a fifth bandpass filter coupled to filter said second difference signal on said horizontal axis;

a sixth bandpass filter coupled to filter said second difference signal on said vertical axis;

a seventh bandpass filter coupled to filter said second difference signal on both said horizontal axis and said vertical axis;

a fifth switch coupled to select an output of said fifth bandpass filter when said first correlator detects strong horizontal correlation, an output of said sixth bandpass filter when said first correlator detects strong vertical correlation and weak horizontal correlation, and an output of said seventh bandpass filter when said first correlator detects weak horizontal and vertical correlation, thereby obtaining a chrominance difference signal; and a sixth subtractor coupled to subtract said chrominance difference signal from said second difference signal, thereby obtaining said luminance difference signal.

With the above arrangement, the selection of the outputs of the bandpass filters in the luminance difference signal generating means is made in accordance with the output of the correlator also used for the motion detection, so that the configuration of the entire circuitry is simple.

The luminance difference signal producing means may comprise:

a fourth subtractor coupled to take a difference between two signals differing by a one-frame delay among said second plurality of signals, thereby obtaining a second difference signal;

a second correlator coupled to detect whether horizontal correlation and vertical correlation of said second difference signal are strong or weak;

a fifth bandpass filter coupled to filter said second difference signal on said horizontal axis;

a sixth bandpass filter coupled to filter said second difference signal on said vertical axis;

a seventh bandpass filter coupled to filter said second difference signal on both said horizontal axis and said vertical axis;

a fifth switch coupled to select an output of said fifth bandpass filter when said second correlator detects strong horizontal correlation, an output of said sixth bandpass filter when said second correlator detects strong vertical correlation and weak horizontal correlation, and an output of said seventh bandpass filter when said second correlator detects weak horizontal and vertical correlation, thereby obtaining a chrominance difference signal; and a sixth subtractor coupled to subtract said chrominance difference signal from said second difference signal, thereby obtaining said luminance difference signal.

With the above arrangement, the selection of the bandpass filters receiving the frame difference signal is made in accordance with the correlation of the same frame difference signal, so that the selection can be accomplished more appropriately.

The luminance difference signal producing means may comprise:

an eighth bandpass filter coupled to filter said one of said second plurality of signals on said horizontal axis;

a ninth bandpass filter coupled to filter said one of said second plurality of signals on said vertical axis;

a tenth bandpass filter coupled to filter said one of said second plurality of signals on both said horizontal axis and said vertical axis;

a sixth switch coupled to select an output of said eighth bandpass filter when said first correlator detects strong horizontal correlation, an output of said ninth bandpass filter when said first correlator detects strong vertical correlation and weak horizontal correlation, and an output of said tenth bandpass filter when said first correlator detects weak horizontal and vertical correlation, thereby obtaining a filtered chrominance signal;

a sixth subtractor coupled to subtract said filtered chrominance signal from said composite video signal, thereby obtaining a filtered luminance signal;

a 1 F delay means coupled to delay said filtered luminance signal by one frame interval, thereby obtaining a delayed luminance signal; and a seventh subtractor coupled to take a difference between said filtered luminance signal and said delayed luminance signal, thereby obtaining said luminance difference signal.

With the above arrangement, the selection of the outputs of the bandpass filters in the luminance difference signal generating means is made in accordance with the output of the correlator also used for the motion detection, so that the configuration of the entire circuitry is simple. Moreover, the selection of the bandpass filters receiving the composite video signal is made in accordance with the correlation of the same composite video signal, so that the selection can be accomplished more appropriately.

BRIEF DESCRIPTION OF THE DRAWINGS

FIG. 12B shows a spatial frequency spectrum with strong horizontal and weak vertical correlation.

DETAILED DESCRIPTION OF THE INVENTION

Three purely illustrative embodiments of the invention will be described with reference to the attached drawings.

All three embodiments share a common motion detector, for which there are several possible variations. Accordingly, first the structure of all three embodiments will be described, then the structural variations of the motion detector will be described, and finally the operation of all these embodiments and variations will be described.

Figure 1:
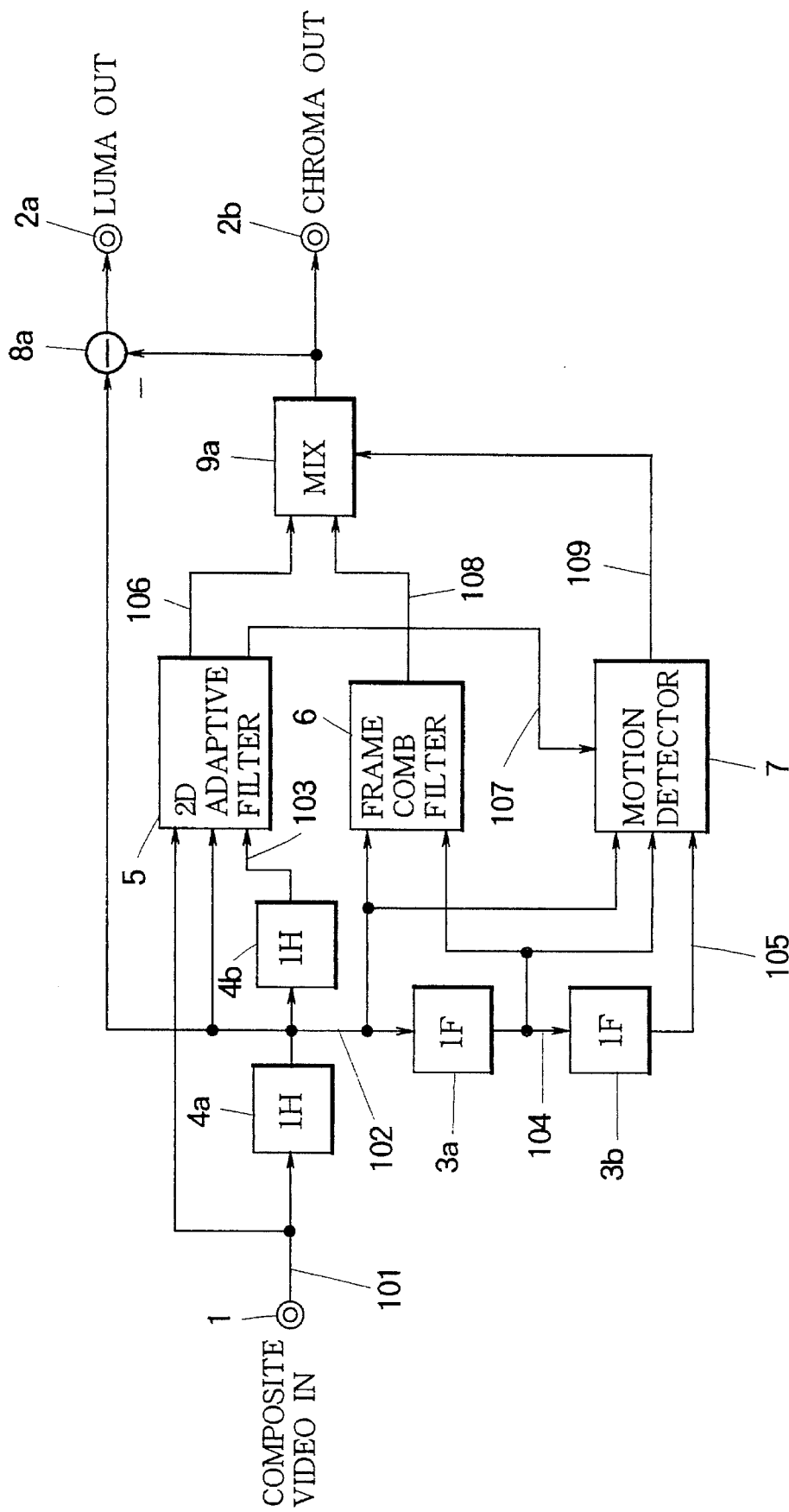
FIG. 1 is a block diagram of a first embodiment of the invented chrominance-luminance separation filter.

Referring to FIG. 1, the first embodiment comprises an input terminal 1 for input of an NTSC composite video signal, a luminance output terminal 2a for output of a luminance signal, a chrominance output terminal 2b for output of a chrominance signal, a pair of 1F delay means 3a and 3b each providing a delay equal to one frame period, a pair of 1H delay means 4a and 4b each providing a delay equal to one horizontal scan period, a two-dimensional adaptive filter 5, a frame comb filter 6, a motion detector 7, a subtractor 8a, and a mixer 9a. These elements are interconnected as shown in the drawing. In particular, the two 1H delay means 4a and 4b are coupled in series to the input terminal 1 to delay the input signal 101, and the two 1 F delay means 3a and 3b are coupled in series to the output of the 1H delay means 4a.

The outputs 102, 103, 104, and 105 of the delay means 4a, 4b, 3a, and 3b are identical copies of the input signal 101, differing only in the amounts by which they are delayed. The term "composite video signal" refers generally to all of these signals. Of them, the output 102 of the 1H delay means 4a represents the current line of the current frame. To avoid confusion, this output will be referred to as the composite video signal 102, the original input at the input terminal 1 will be termed the next-line signal 101, the output of the 1H delay means 4b will be termed the previous-line signal 103, and the outputs of the 1 F delay means 3a and 3b will be termed the one-frame delayed signal 104 and two-frame delayed signal 105, respectively.

From the next-line signal 101, composite video signal 102, and previous-line signal 103, the two-dimensional adaptive filter 5 generates a first chrominance signal 106 and correlation signal 107. From the composite video signal 102 and one-frame delayed signal 104, the frame comb filter 6 generates a second chrominance signal 108. From the composite video signal 102, one-frame delayed signal 104, two-frame delayed signal 105, and correlation signal 107, the motion detector 7 generates a motion signal 109. Depending on the internal structure of the motion detector 7, input of the correlation signal 107 to the motion detector 7 may be omitted.

The mixer 9a mixes the first and second chrominance signals 106 and 108 under control of the motion signal 109, thereby generating the chrominance signal output at the chrominance output terminal 2b. The subtractor 8a subtracts this output chrominance signal from the composite video signal 102 to generate the luminance signal output at the luminance output terminal 2a.

Figure 2:
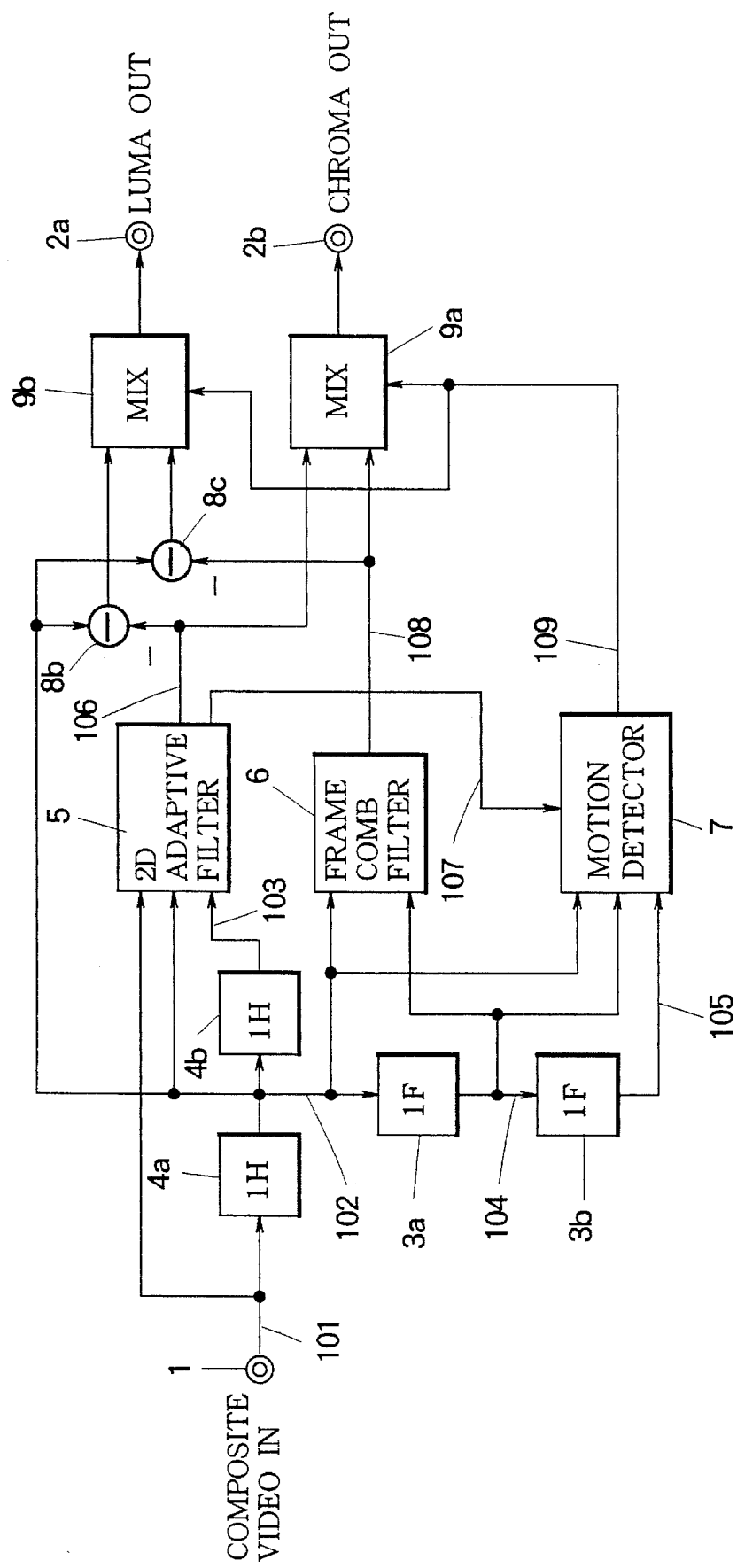
FIG. 2 is a block diagram of a second embodiment of the invented chrominance-luminance separation filter.

FIG. 2 shows the structure of the second embodiment, which is similar to the first embodiment of FIG. 1 except that the first and second chrominance signals 106 and 108 are subtracted separately from the composite video signal 102, and the differences are then mixed. Specifically, the subtractor 8a of FIG. 1 is replaced by a pair of subtractors 8b and 8c, and an additional mixer 9b is provided. The first subtractor 8b subtracts the first chrominance signal 106 from the composite video signal 102. The second subtractor 8c subtracts the second chrominance signal 108 from the composite video signal 102. The mixer 9b mixes the outputs of the two subtractors 8b and 8c according to the motion signal 109, thereby creating the luminance signal output at the luminance output terminal 2a.

Figure 3:
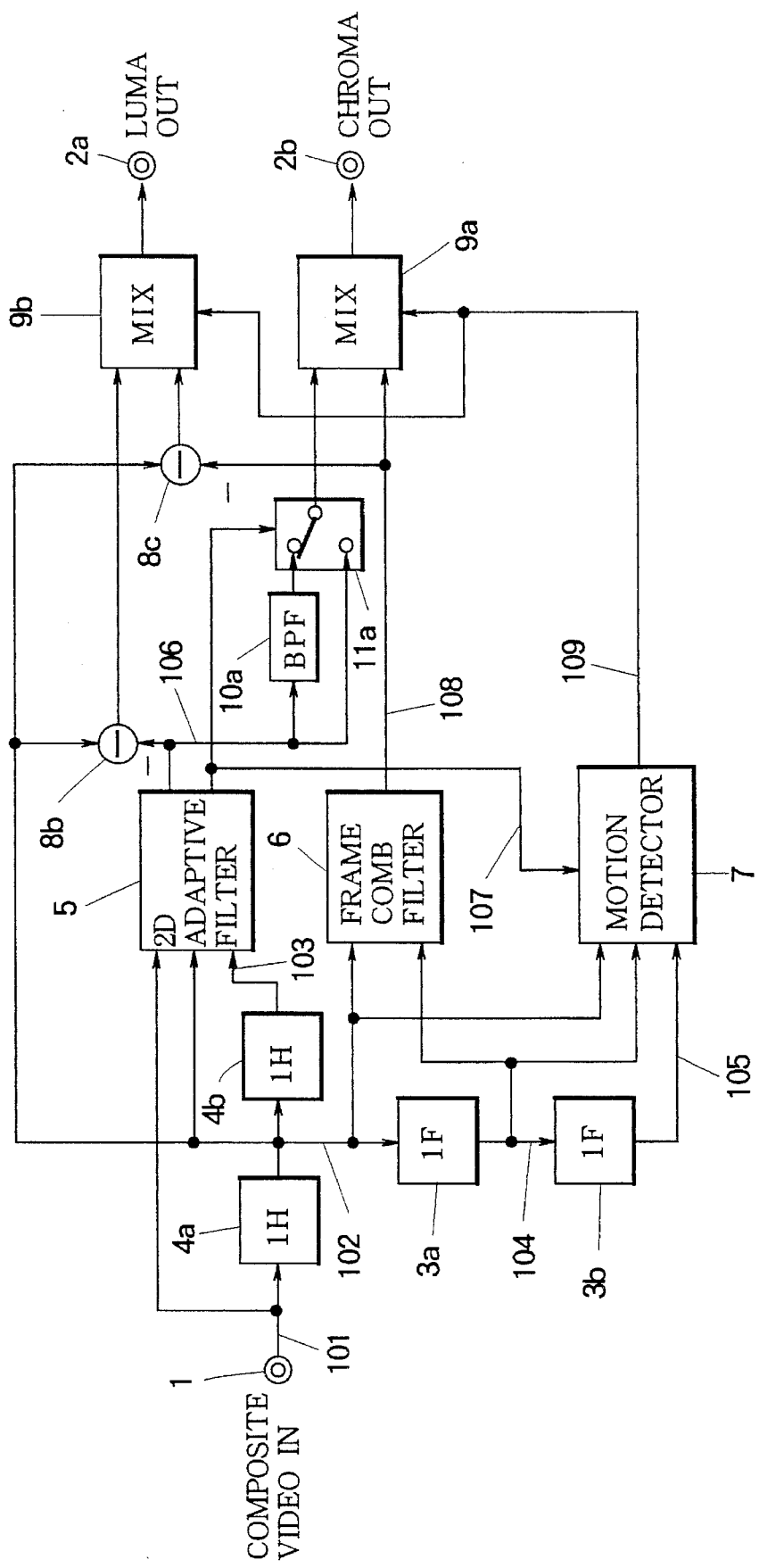
FIG. 3 is a block diagram of a third embodiment of the invented chrominance-luminance separation filter.

FIG. 3 shows the structure of a third embodiment, which is identical to the second embodiment of FIG. 2 except for the addition of a horizontal bandpass filter (BPF) 10a and switch 11a between the two-dimensional adaptive filter 5 and mixer 9a. The horizontal bandpass filter 10a filters the first chrominance signal 106 on the horizontal axis, passing horizontal spatial frequencies in a certain high-frequency region. In the following discussion, such a filter will be described as having a high-frequency horizontal passband. The switch 11a is controlled by the correlation signal 107 from the two-dimensional adaptive filter 5, and selects either the first chrominance signal 106 or the filtered output of the horizontal bandpass filter 10a for input to the mixer 9a.

The invention is best practiced with digital circuitry, in which case all signals shown FIGS. 1 to 3 are digital signals comprising a certain number of bits each. The 1H delay means 4a and 4b are, for example, line memories. The 1F delay means 3a and 3b are, for example, frame memories. The two-dimensional adaptive filter 5, frame comb filter 6, motion detector 7, subtractor 8a, and mixer 9amay be implemented as special-purpose digital signal-processing circuits comprising adders, multipliers, and the like. Alternatively, they may be implemented by a suitably-programmed general-purpose digital signal processor, or other suitably-programmed processor.

Figure 4:
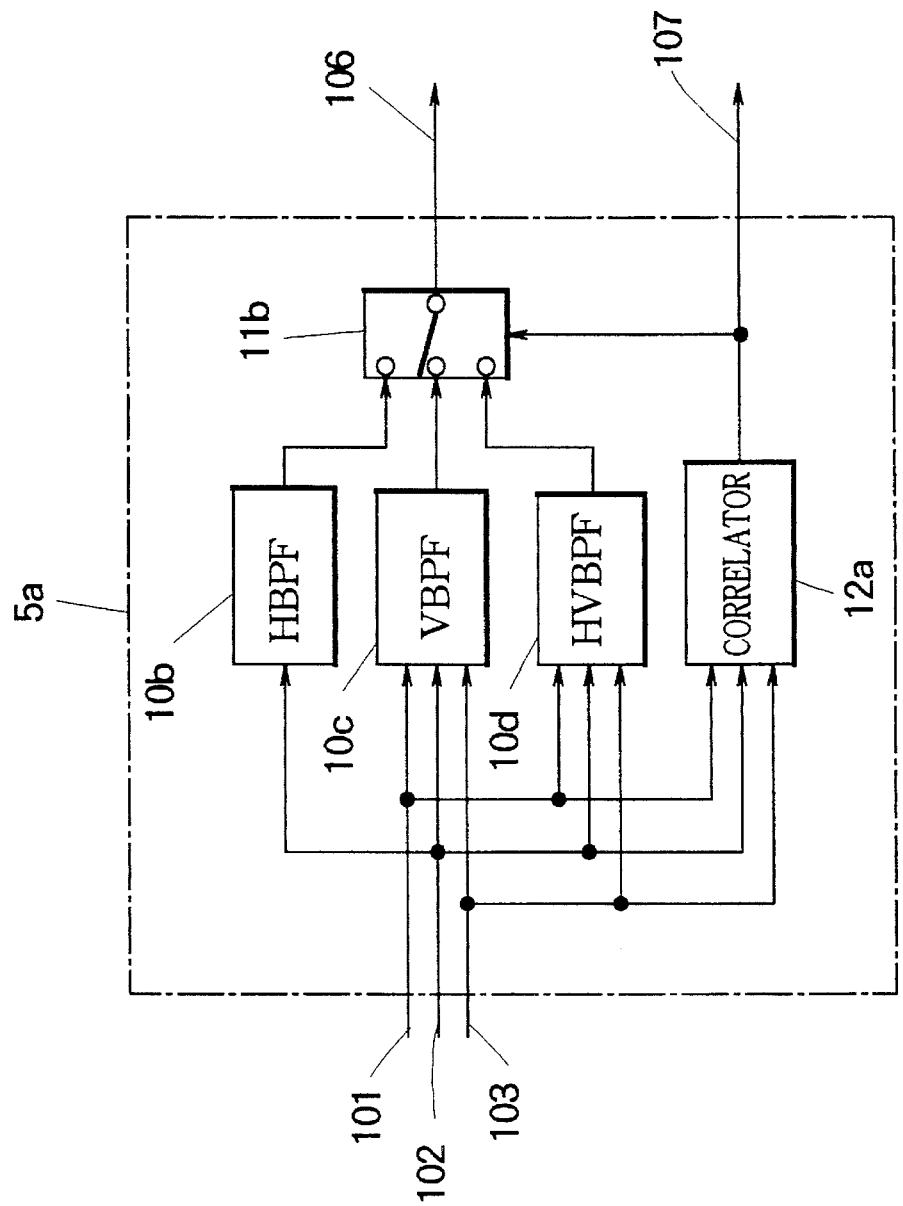
FIG. 4 is a block diagram of the two-dimensional adaptive filter in FIGS. 1 to 3.

FIG. 4 shows an example of the internal structure of the two-dimensional adaptive filter 5 in FIGS. 1, 2, and 3, comprising a horizontal bandpass filter 10b with a high-frequency horizontal passband, a vertical bandpass filter 10c with a high-frequency vertical passband, a horizontal and vertical bandpass filter 10d, a switch 11b, and a correlator 12a. The horizontal and vertical bandpass filter 10d restricts spatial frequencies to high-frequency regions on both the horizontal and vertical axes.

The bandpass filters 10b, 10c, and 10d filter the composite video signal 102 on the horizontal and/or vertical axis, the vertical bandpass filter 10c and horizontal and vertical bandpass filter 10d also making use of the next-line and previous-line signals 101 and 103. From signals 101, 102, and 103 the correlator 12a generates the correlation signal 107, which is supplied to the switch 11b and is output to the motion detector 7. Under control of the correlation signal 107, the switch 11b selects the output of one of the bandpass filters 10b, 10c, and 10d, the selected output becoming the first chrominance signal 106.

The horizontal passband of the horizontal bandpass filter 10a in FIG. 3 is contained within, and is narrower than, the horizontal passbands of the horizontal bandpass filter 10b and horizontal and vertical bandpass filter 10d in FIG. 4.

Figure 5:
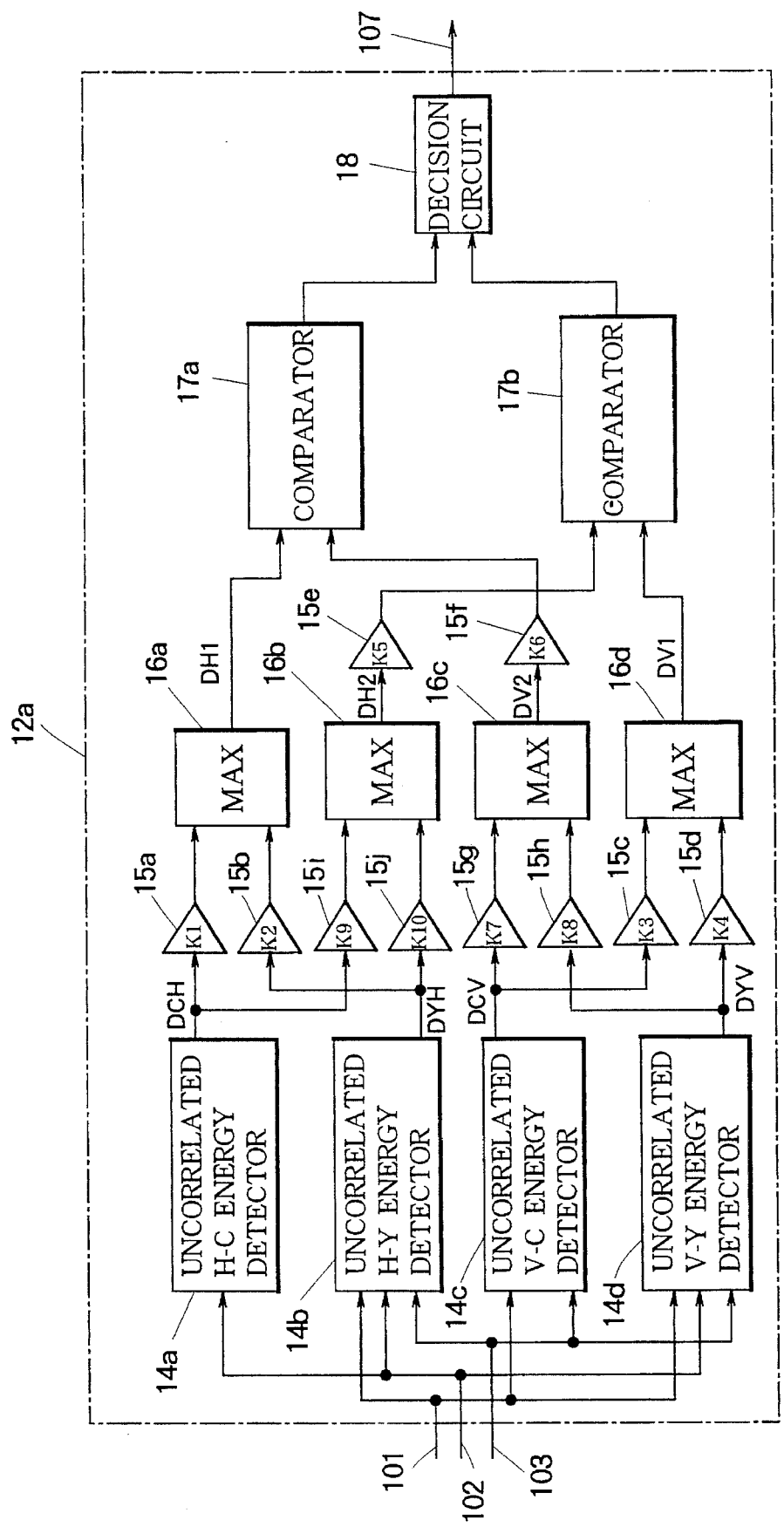
FIG. 5 is a block diagram of an example of the correlator 12a in the two-dimensional adaptive filter in FIG. 4.

FIG. 5 shows the internal structure of the correlator 12a in FIG. 4. The composite video signal 102 is input to an uncorrelated horizontal chrominance energy detector 14a and an uncorrelated horizontal luminance energy detector 14b. The uncorrelated horizontal chrominance energy detector 14a generates an output signal DCH. The uncorrelated horizontal luminance energy detector 14b also receives the next-line and previous-line signals 101 and 103, and generates an output signal DYH. DCH is multiplied by constants K1 and K9 in multipliers 15a and 15i, while DYH is multiplied by constants K2 and K10 in multipliers 15b and 15j. A maximum selector 16a selects the larger of the two outputs of multipliers 15a and 15b, thus generating an output signal DH1. Another maximum selector 16b selects the larger of the two outputs of multipliers 15i and 15j, thus generating an output signal DH2, which is multiplied by a constant K5 in a multiplier 15e. DH1 and DH2.K5 are input to respective comparators 17a and 17b and compared with other signals to be described below. The outputs of the comparators are input to a decision circuit 18, which generates the correlation signal 107.

The next-line signal 101 and previous-line signal 103 are also input to an uncorrelated vertical chrominance energy detector 14c, which generates an output signal DCV. The next-line signal 101, composite video signal 102, and previous-line signal 103 are all input to an uncorrelated vertical luminance energy detector 14d, which generates an output signal DYV. DCV and DYV are processed in a manner analogous to DCH and DYH. DCV is multiplied by constants K3 and K7 in multipliers 15c and 15g, while DYV is multiplied by constants K4 and K8 in multipliers 15d and 15h. A maximum selector 16c selects the larger of the two outputs of the multipliers 15g and 15h, thus generating an output signal DV2 which is multiplied by a constant K6 in a multiplier 15f. Another maximum selector 16d selects the larger of the two outputs of the multipliers 15c and 15d, thus generating an output signal DV1. DV1 is input to comparator 17b and compared with DV2.KS, while DV2.K6 is input to comparator 17a and compared with DH1.

Next six motion detectors 7a to 7f will be described. The motion detector 7 in FIGS. 1 to 3 may be any one of these six.

Figure 6:
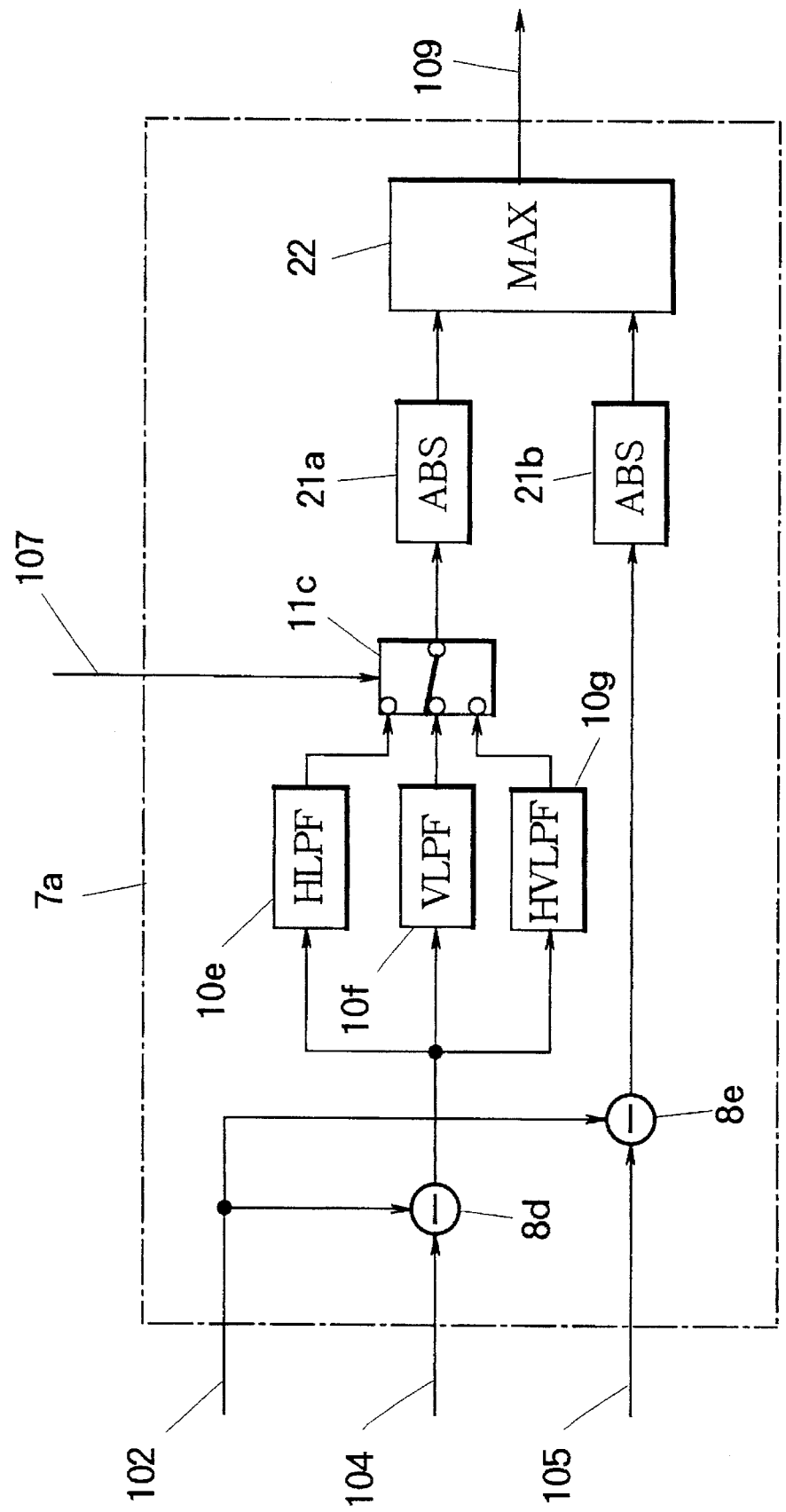
FIG. 6 is a block diagram of a first example of the motion detector in FIGS. 1 to 3.

FIG. 6 shows the internal structure of motion detector 7a. The composite video signal 102, one-frame delayed signal 104, and two-frame delayed signal 105 are input to a pair of subtractors 8d and 8e which calculate, respectively, the difference between the composite video signal 102 and one-frame delayed signal 104, and the difference between the composite video signal 102 and two-frame delayed signal 105. The output of the subtractor 8d is supplied to a horizontal low-pass filter (LPF) 10e, a vertical low-pass filter 10f, and a horizontal and vertical low-pass filter 10g, which filter the difference signal output by the subtractor 8d on the horizontal axis, the vertical axis, and both the horizontal and vertical axes, respectively. By rejecting high frequencies, these filters reject chrominance information and high-frequency luminance information, leaving comparatively low-frequency luminance information. A switch 11c selects one of the outputs of the low-pass filters 10e, 10f, and 10g under control of the correlation signal 107, and provides it as a luminance difference signal.

An absolute-value circuit 21a takes the absolute value of the luminance difference signal output by the switch 11c. Another absolute-value circuit 21b takes the absolute value of the output of the subtractor 8e (the difference between the composite video signal 102 and two-frame delayed signal 105). A maximum selector 22 selects the larger of the two absolute values output by the absolute-value circuits 21a and 21b for output as the motion signal 109.

Figure 7:
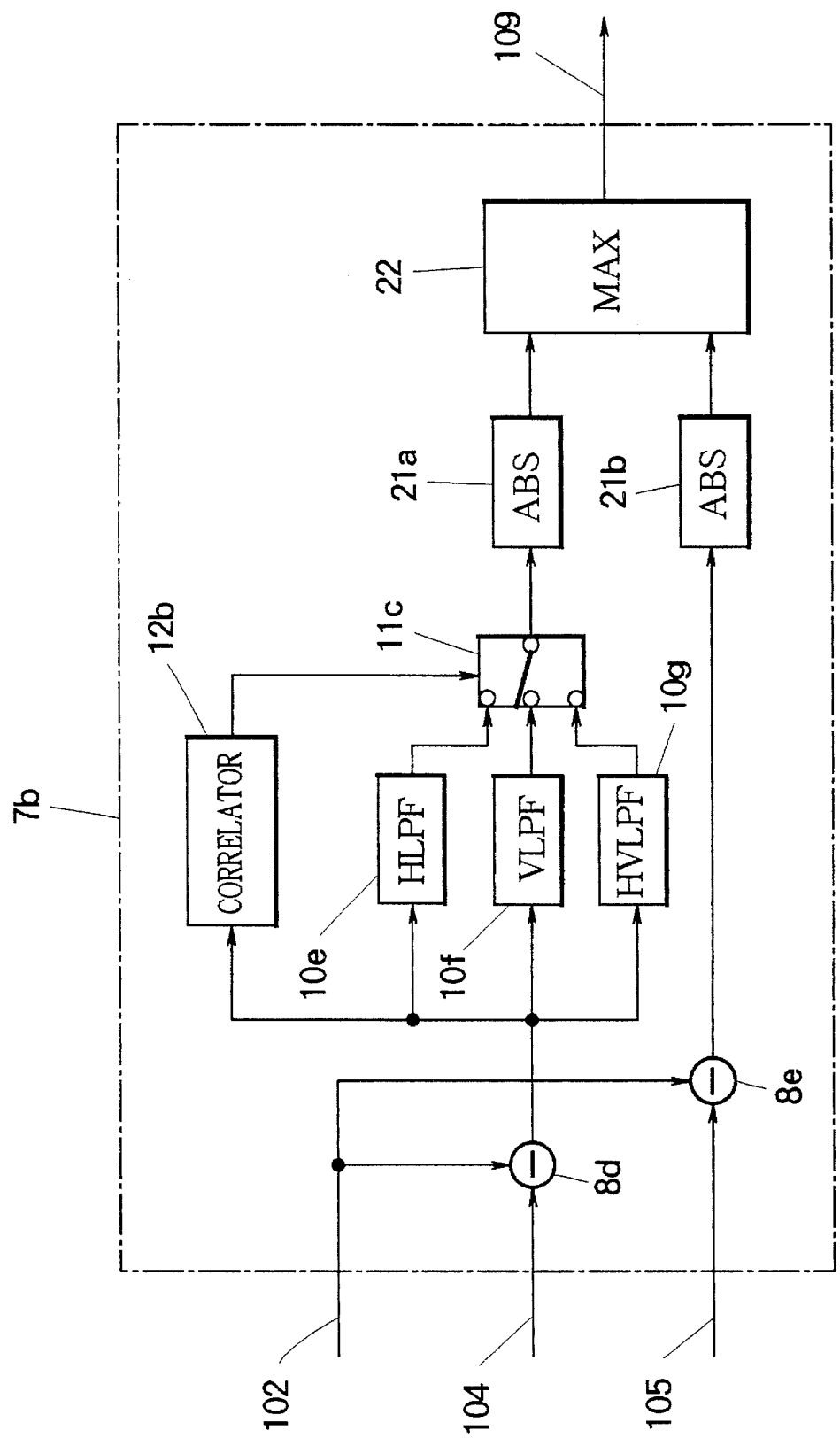
FIG. 7 is a block diagram of a second example of the motion detector in FIGS. 1 to 3.

FIG. 7 shows the internal structure of motion detector 7b, which is identical to motion detector 7a in FIG. 6 except for the addition of a correlator 12b that receives the difference signal output by the subtractor 8d and controls the switch 11c. Accordingly, the motion detector 7b in FIG. 7 does not require input of the correlation signal 107 in FIGS. 1 to 3.

Figure 8:
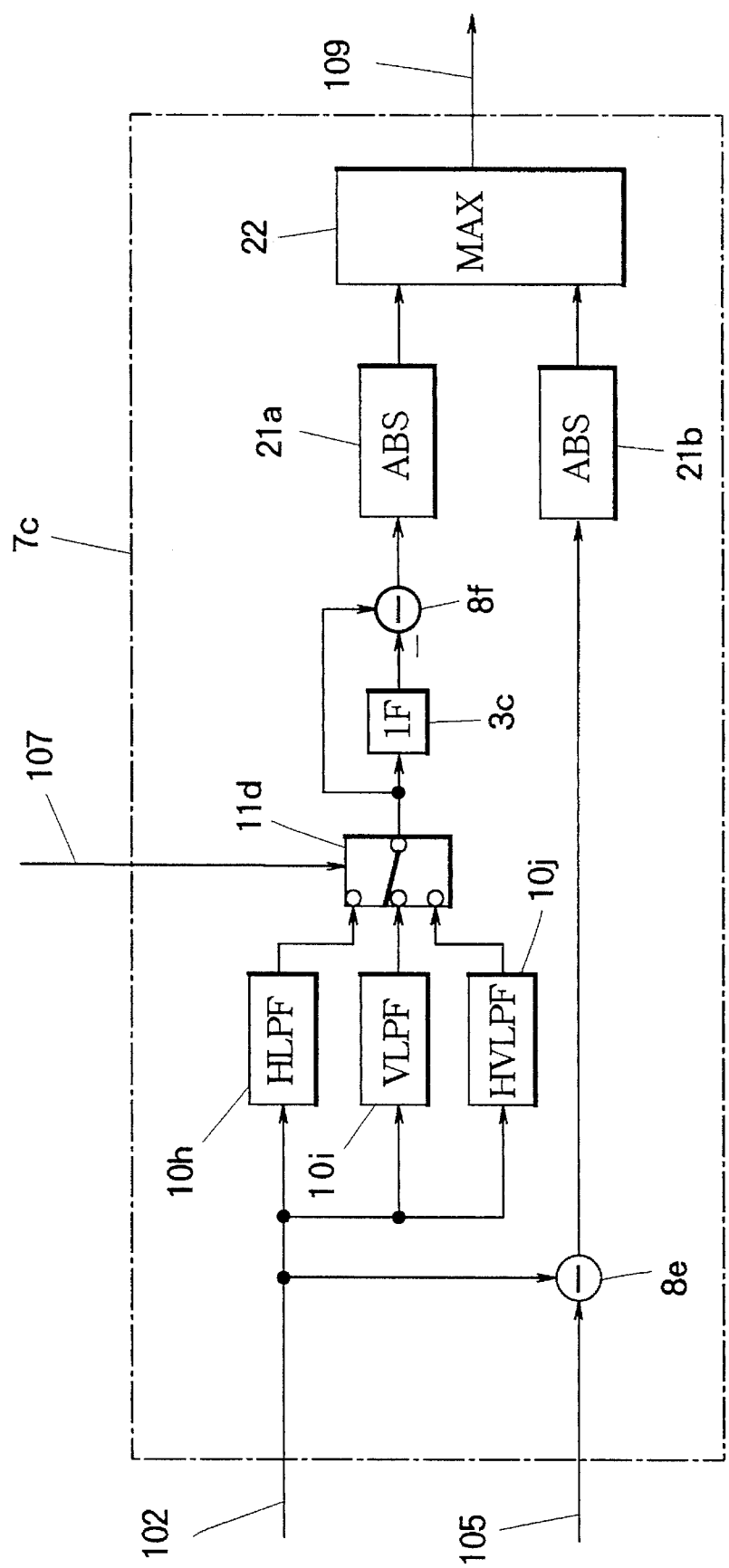
FIG. 8 is a block diagram of a third example of the motion detector in FIGS. 1 to 3.

FIG. 8 shows the internal structure of motion detector 7c. Elements identical to elements in FIG. 6 have the same reference numerals. The composite video signal 102 is supplied to a horizontal low-pass filter 10h, a vertical low-pass filter 10i, and a horizontal and vertical low-pass filter 10j. A switch 11d selects one of the outputs of these three low-pass filters 10h, 10i, and 10j, under control of the correlation signal 107 received from the two-dimensional adaptive filter 5, as a filtered luminance signal. A 1 F delay means 3c delays this filtered luminance signal by one frame period. A subtractor 8f subtracts the delayed luminance signal output by the 1 F delay means 3c from the undelayed signal output by the switch 11d, and sends the resulting luminance difference signal to the absolute-value circuit 21a. The absolute-value circuits 21a and 21b, subtractor 8e, and maximum selector 22 are as described in FIG. 6.

Figure 9:
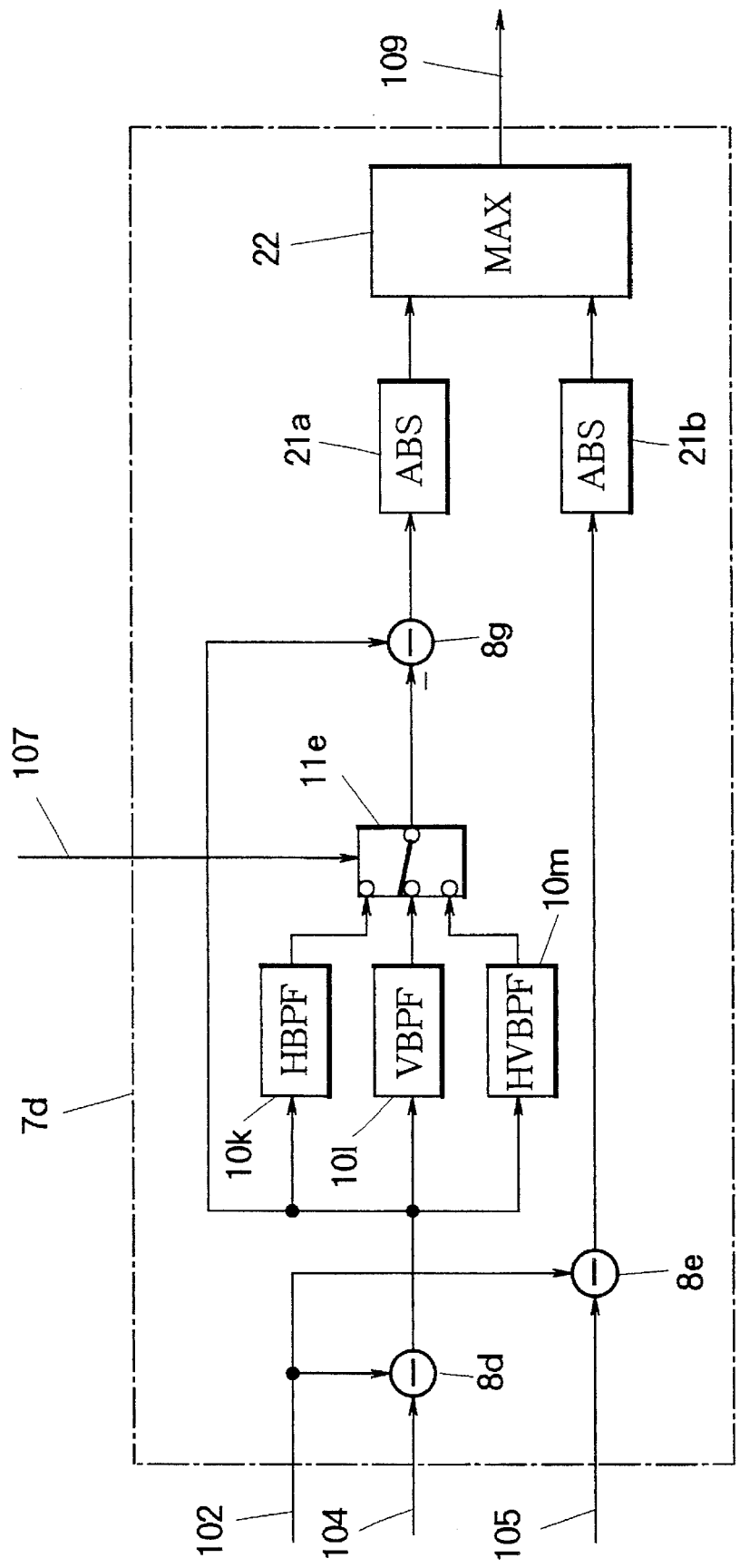
FIG. 9 is a block diagram of a fourth example of the motion detector in FIGS. 1 to 3.

FIG. 9 shows the internal structure of motion detector 7d. Elements identical to elements in FIG. 6 have the same reference numerals. The difference signal output by the subtractor 8d is supplied to a horizontal bandpass filter 10k, a vertical bandpass filter 10l, a horizontal and vertical bandpass filter 10m, and another subtractor 8g. The filters 10k, 10l, and 10m have high-frequency passbands that pass chrominance frequencies on their respective axes. A switch 11e selects one of the outputs of the three filters 10k, 10l, and 10m, under control of the correlation signal 107 received from the two-dimensional adaptive filter 5, as a chrominance difference signal. The subtractor 8g subtracts this chrominance difference signal from the output of the subtractor 8d to create a luminance difference signal, which is supplied to the absolute-value circuit 21a. The absolute-value circuits 21a and 21b, subtractor 8e, and maximum selector 22 are as described in FIG. 6.

Figure 10:
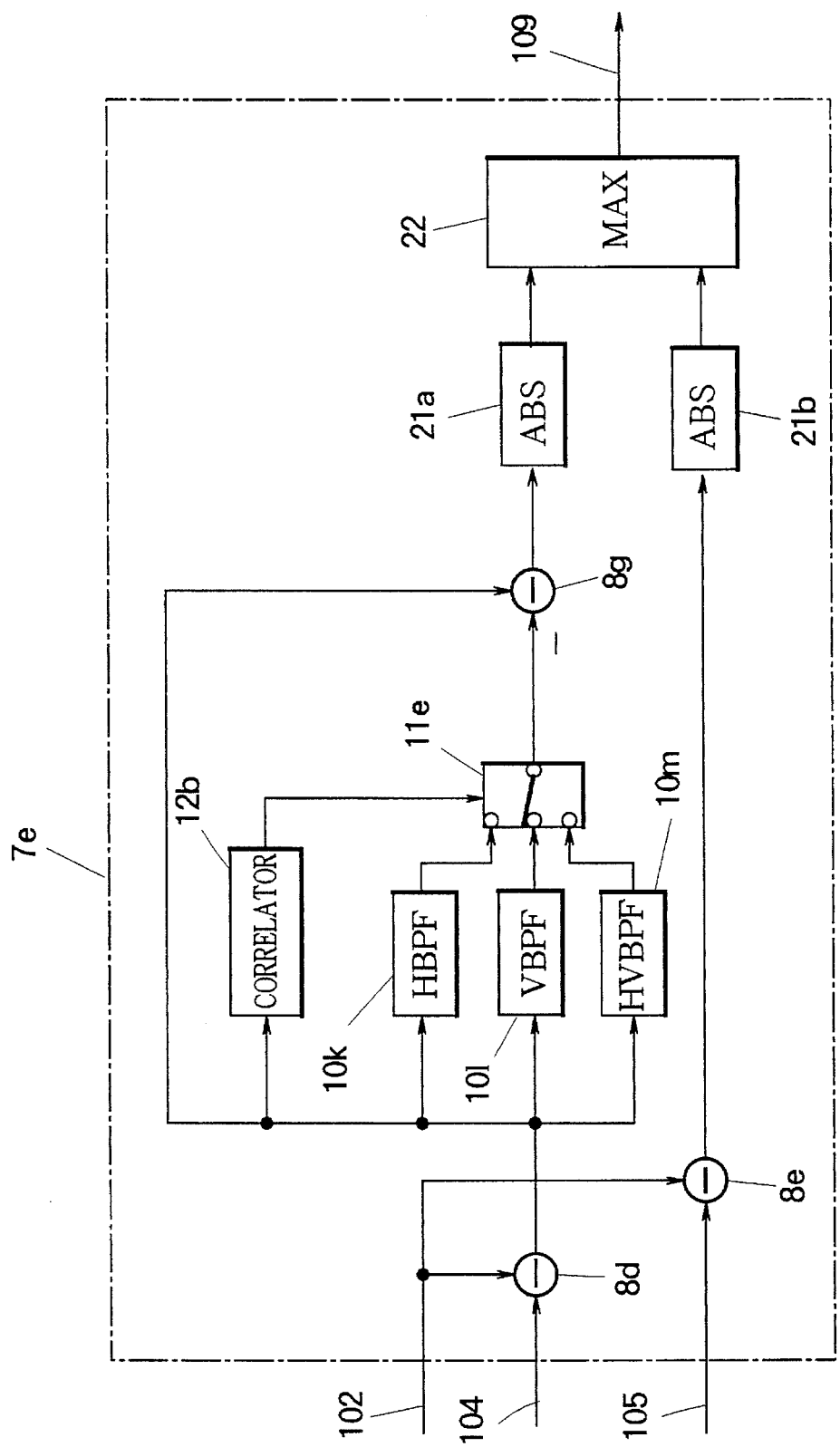
FIG. 10 is a block diagram of a fifth example of the motion detector in FIGS. 1 to 3.

FIG. 10 shows the internal structure of motion detector 7e. Elements identical to elements in FIGS. 7 and 9 have the same reference numerals. FIG. 10 is related to FIG. 9 in the same way that FIG. 7 was related to FIG. 6: a correlator 12b receives the output of the subtractor 8d and controls the switch 11e, replacing the correlation signal 107 from the two-dimensional adaptive filter 5.

Figure 11:
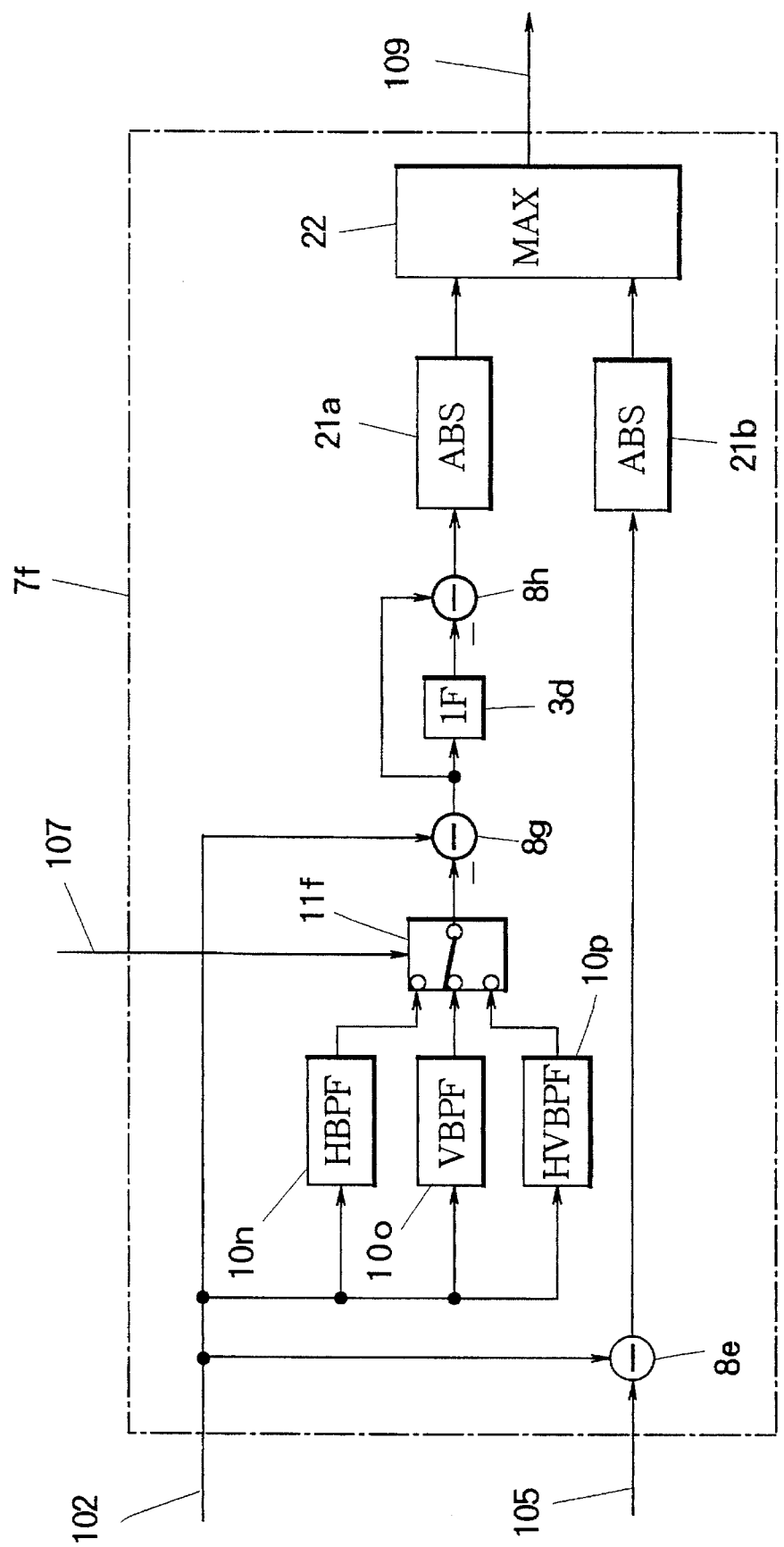
FIG. 11 is a block diagram of a sixth example of the motion detector in FIGS. 1 to 3.

FIG. 11 shows the internal structure of motion detector 7f. Elements identical to elements in FIG. 9 have the same reference numerals. The composite video signal 102 is supplied to a subtractor 8g, horizontal bandpass filter 10n, vertical bandpass filter 10o, and horizontal and vertical bandpass filter 10p. A switch 11f selects one of the outputs of the three bandpass filters 10n, 10o, and 10p, under control of the correlation signal 107 received from the two-dimensional adaptive filter 5, as a filtered chrominance signal. The subtractor 8g subtracts this filtered chrominance signal from the composite video signal 102 and supplies the resulting difference as a filtered luminance signal to a 1 F delay means 3d, which delays it by one frame period, creating a delayed luminance signal. A subtractor 8h subtracts the delayed output of the 1 F delay means 3d from the undelayed output of the subtractor 8g, and supplies the resulting luminance difference signal to the absolute-value circuit 21a. The absolute-value circuits 21a and 21b, subtractor 8e, and maximum selector 22 are as described in FIG. 6.

Next the operation will be explained.

The bandpass filters 10b, 10e, and 10d in the two-dimensional adaptive filter 5 extract chrominance signal components. These filters have, for example, the following transfer functions:

HBPF 10b: $C_H(Z) = (1 - 4Z^{-2} + 6Z^{-4} - 4Z^{-6} + Z^{-8})/16$

VBPF 10c: $C_V(Z) = (-1 + 2Z^{-L} - Z^{-2L})/4$

HVBPF 10d: $C_{HV}(Z) = C_H(Z) \cdot C_V(Z)$ $Z^{-1}$ represents a one-pixel delay and $Z^{-L}$ a one-line delay. If f is frequency, $f_{SC}$ is the chroma subcarrier frequency (3.58 MHz for an NTSC signal), and j is the square root of minus one, then:

$$Z^{-1} = \exp(-j2\pi f/4f_{SC})$$

In the NTSC system, $f_{SC} = (455/2)f_H$ (where fH is the horizontal scan frequency), so L=910.

The outputs of these filters are switched as follows, according to the correlation of the composite video signal in the horizontal and vertical directions. When the correlator 12a finds strong horizontal correlation in the composite video signal, the output of the horizontal bandpass filter 10b is selected. When the correlator 12a finds weak horizontal correlation but strong vertical correlation, the output of the vertical bandpass filter 10c is selected. When the correlator 12a finds weak horizontal and vertical correlations, the output of the horizontal and vertical bandpass filter 10d is selected.

In the correlator 12a, the transfer function DCH(Z) of the uncorrelated horizontal chrominance energy detector 14a, the transfer function DYH(Z) of the uncorrelated horizontal luminance energy detector 14b, the transfer function DCV(Z) of the uncorrelated vertical chrominance energy detector 14c, and the transfer function DYV(Z) of the uncorrelated vertical luminance energy detector 14d can be expressed, for example, as follows:

$$DCH(Z) = |1 - Z^{-4}|$$
$$DYH(Z) = \max\{|(1 + Z^{-L})^2 \cdot (1 - Z^{-2})/4|,$$
$$|(1 + Z^{-L})^2 \cdot (Z^{-2} - Z^{-4})/4|\}$$
$$DCV(Z) = |(1 - Z^{-2})^2 \cdot (1 + Z^{-2L})|$$
$$DYV(Z) = \max\{|(1 + Z^{-2})^2 \cdot (1 - Z^{-L})/4|,$$
$$|(1 + Z^{-2})^2 \cdot (Z^{-L} - Z^{-2L})/4|\}$$

Vertical bars indicate absolute values and "max" indicates the maximum of the terms inside braces.

The outputs DCH, DYH, DCV, and DYV determined by the above transfer functions are used to calculate a first uncorrelated horizontal energy DH1, second uncorrelated horizontal energy DH2, first uncorrelated vertical energy DV1, and second uncorrelated vertical energy DV2 as follows:

DH1=max{K1.DCH, K2.DYH}

DH2=max{K9.DCH, K10.DYH}

DV1=max{K3.DCV, K4.DYV}

DV2=max{K7.DCV, K8.DYV}

The decision circuit 18 then determines correlation according to the following conditions, and controls the switch 11b to select the indicated bandpass filter output. (K1 to K10 are constants as mentioned above.)

(1) If DV1≧K5.DH2 and DH1≧K6.DV2, horizontal correlation and vertical correlations are both strong. The output of the horizontal BPF 10b is selected. As an alternative, the output of the vertical BPF 10e or the output of the horizontal and vertical BPF 10d may be selected.

(2) If DV1≧K5.DH2 and DH1<K6.DV2, horizontal correlation is strong but vertical correlation is weak. The output of the horizontal BPF 10b is selected.

(3) If DV1<K5.DH2 and DH1≧K6.DV2, horizontal correlation is weak but vertical correlation is strong. The output of the vertical BPF 10c is selected.

(4) If DV1<K5.DH2 and DH1<K6.DV2, horizontal and vertical correlation are both weak. The output of the horizontal and vertical BPF 10d is selected.

The selected bandpass filter output becomes the first chrominance signal 106.

FIGS. 12A to 12D show examples of correlation on the spatial frequency plane. In each of these figures, horizontal frequencies are shown in megahertz on the horizontal axis, and vertical frequencies in cycles per height on the vertical axis. In each case, the luminance signal has frequencies in the area bounded by the solid line, and the chrominance signal has frequencies in the area bounded by the dotted line.

A dot indicated by an arrow represents the location of the chroma subcarrier frequency $f_{SC}$. Dash-dot lines indicate the passband of the selected bandpass filter.

Figure 12A:
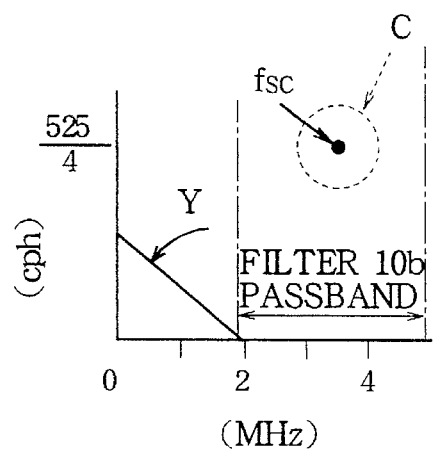
FIG. 12A shows a spatial frequency spectrum with strong horizontal and vertical correlation.
Figure 12A:
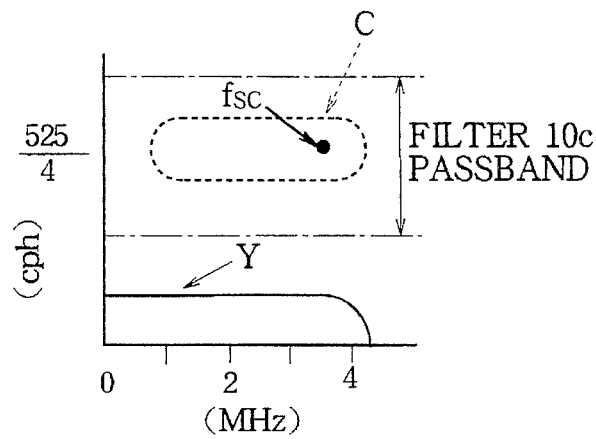

FIG. 12A illustrates condition (1), with strong horizontal and vertical correlation. Bandpass filtering on the horizontal axis enables the horizontal bandpass filter 10b to pass all chrominance frequencies while rejecting all luminance frequencies.

FIG. 12B illustrates condition (2), with strong horizontal correlation but weak vertical correlation. Again, bandpass filtering on the horizontal axis enables the horizontal bandpass filter 10b to pass all chrominance frequencies while rejecting all luminance frequencies.

Figure 12C:
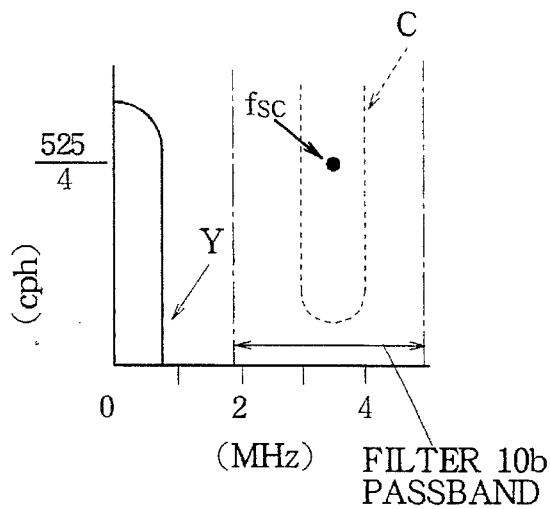
FIG. 12C shows a spatial frequency spectrum with weak horizontal and strong vertical correlation.

FIG. 12C illustrates condition (3), with weak horizontal correlation but strong vertical correlation. Bandpass filtering on the vertical axis enables the vertical bandpass filter 10c to pass all chrominance frequencies while rejecting all luminance frequencies.

Figure 12D:
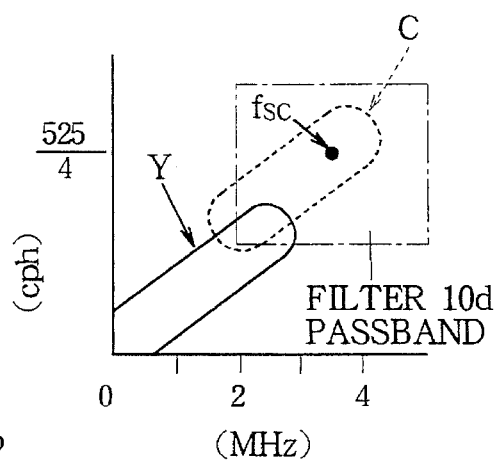
FIG. 12D shows a spatial frequency spectrum with weak horizontal and vertical correlation.

FIG. 12D illustrates condition (4), with weak horizontal and vertical correlation. Bandpass filtering on both axes enables the horizontal and vertical bandpass filter 10d to pass most chrominance frequencies while rejecting most luminance frequencies.

From FIGS. 12A to 12D it can be seen that the invented method of selecting the filtering axis or axes according to correlation of the composite video signal enables the two-dimensional adaptive filter 5 to separate the chrominance signal from the luminance signal with a high degree of accuracy, thereby reducing such image defects as cross color and dot crawl.

Turning next to the frame comb filter 6, this filter has, for example, the transfer function $$C_S(Z) = (1 - Z^{-F})/2$$

where $Z^{-F}$ represents a one-frame delay. In the NTSC system, in which one frame comprises 525 horizontal scanning lines, F=477,750. This filter provides complete chrominance-luminance separation in stationary parts of the picture.

Letting $C_M$ represent the first chrominance signal 106, $C_S$ the second chrominance signal 108, K the motion signal 109, and C the chrominance signal output at the chrominance output terminal 2b, the mixer 9a combines $C_M$ and $C_S$ to obtain C as follows.

$$C = K \cdot C_M + (1-K) \cdot C_S \quad (0 \leq K \leq 1)$$

The way in which K is determined by the motion detector 7a in FIG. 6 will be described next.

The subtractor 8d in FIG. 6 takes the difference between the composite video signal 102 and the one-frame delayed signal 104. The resulting difference signal represents motion of the luminance signal over a one-frame interval, but it also contains an unwanted high-frequency chrominance component resulting from phase reversal of the chroma subcarrier in consecutive frames, which must be rejected by filtering. This is the purpose of the low-pass filters 10e, 10f, and 10g. These filters have transfer functions $L_H(Z)$, $L_V(Z)$, and $L_{HV}(Z)$ that can be expressed, for example, as follows.

HLPF 10e: $L_H(Z) = (-1 + 4Z^{-2} + 10Z^{-4} + 4Z^{-6} - Z^{-8})/16$
VLPF 10f: $L_V(Z) = (1 + 2Z^{-L} + Z^{-2L})/4$
HVLPF 10g: $L_{HV}(Z) = (-2 - 4Z^{-2} + 3Z^{-4} + 20Z^{-6} +$ $30Z^{-8} + 20Z^{-10} + 3Z^{-12} - 4Z^{-14} - 2Z^{-16}) \cdot$ $(1 + 2Z^{-L} + Z^{-2L})/256$ The outputs of these filters are selected according to the correlation signal 107 from the correlator 12a in the two-dimensional adaptive filter 5, as follows:

(1) If both horizontal and vertical correlation are strong, the output of the horizontal LPF 10e is selected. As an alternative, the output of the horizontal LPF 10f or the output of the horizontal and vertical LPF 10g may be selected.

(2) If horizontal correlation is strong and vertical correlation is weak, the output of the horizontal LPF 10e is again selected.

(3) If horizontal correlation is weak and vertical correlation is strong, the output of the vertical LPF 10f is selected.

(4) If horizontal and vertical correlation are both weak, the output of the horizontal and vertical LPF 10g is selected.

This selection rule enables the selected filter to pass luminance information while rejecting chrominance information. The passband of the horizontal low-pass filter 10e, for example, is disposed to the left of the passband of the horizontal bandpass filter 10b in FIGS. 12A and 12B. The passband of the vertical low-pass filter 10f is disposed generally below the passband of the vertical bandpass filter 10c in FIG. 12C. The passband of the horizontal and vertical low-pass filter 10g is disposed in a rectangle below and to the left of the passband of the horizontal and vertical bandpass filter 10d in FIG. 12D.

The output of the selected filter is thus a luminance difference signal containing luminance motion information with little or no chrominance contamination. In particular, the chrominance information extending into the very low-frequency region present on one spatial axis in FIGS. 12B and 12C is rejected by the selected low-pass filter, which filters on the opposite spatial axis.

In the same way, high-frequency luminance information on one spatial axis in FIGS. 12B and 12C is passed by the selected low-pass filter, which filters on the opposite spatial axis. The motion detector 7a is thus able to detect high-frequency luminance motion occurring over a one-frame interval.

The degree of motion is represented by the absolute value of the luminance difference signal, which the absolute-value circuit 21a supplies to the maximum selector 22.

In addition, the subtractor 8e takes the difference between the composite video signal 102 and the two-frame delayed signal 105, and the absolute-value circuit 21b supplies the absolute value of this difference to the maximum selector 22. The chroma subcarrier in the two signals 102 and 105 is in phase, so the output of the subtractor 8e represents chrominance motion information as well as luminance motion information, including luminance information with high spatial frequencies that might have been rejected by the selected low-pass filter 10e, 10f, or 10g.

The maximum selector 22 selects the larger of the two outputs from the absolute-value circuit 21a and absolute-value circuit 21b as the value K of the motion signal 109. This enables substantially all types of motion to be detected.

Figure 13:
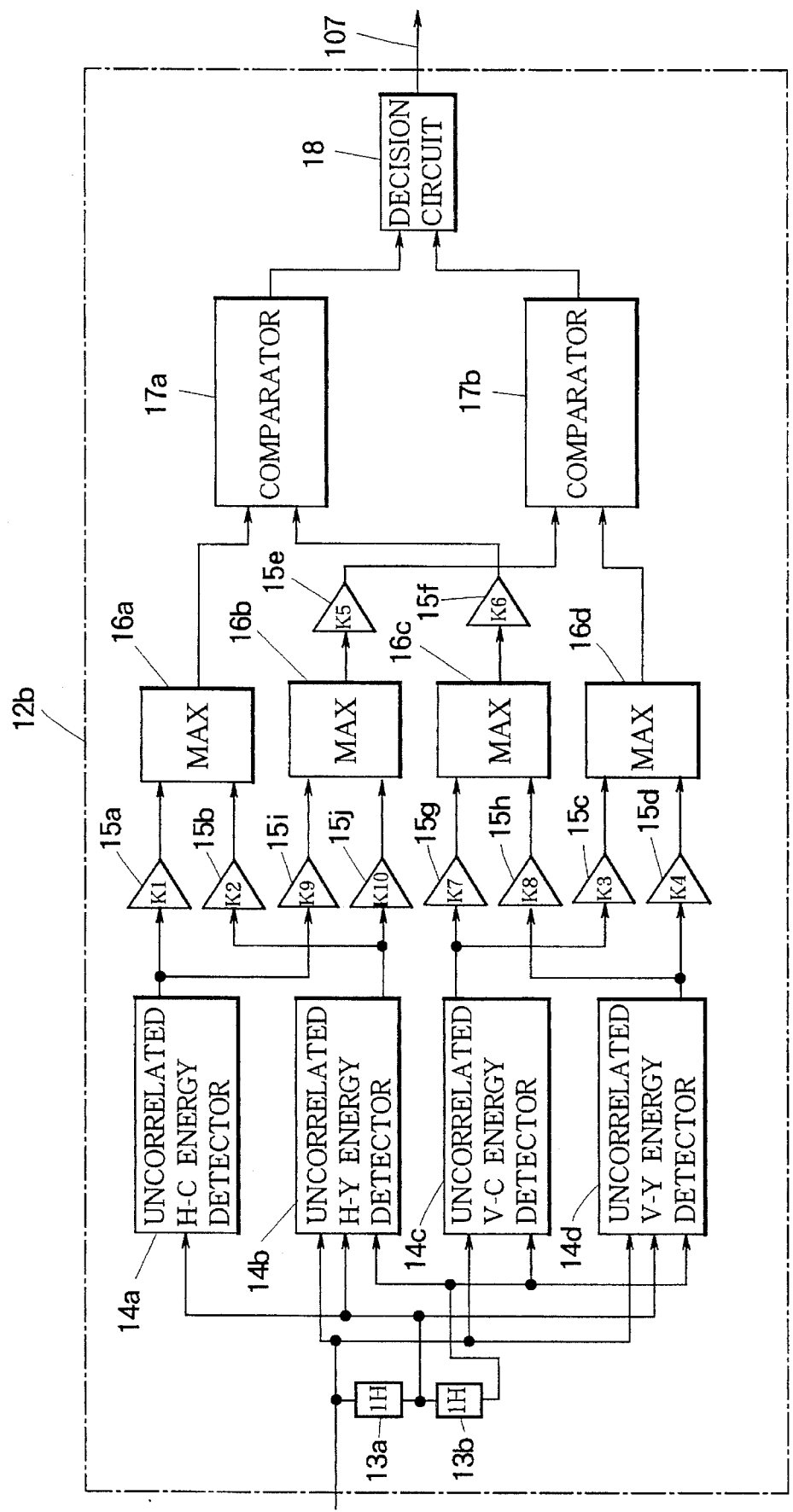
FIG. 13 is a block diagram of an example of the correlator 12b in the motion detecting circuit 7b in FIG. 7.

Next the operation of motion detector 7b in FIG. 7 will be described, concentrating on the differences from FIG. 6. In both FIGS. 6 and 7, the switch 11c is controlled by a correlator, but the correlator 12b in FIG. 7 operates on the one-frame difference signal output from the subtractor 8d, whereas the correlator 12a whose output is used in FIG. 6 operated on the next-line signal 101, composite video signal 102, and previous-line signal 103. As shown in FIG. 13, the correlator 12b may comprise, in addition to the same internal structure as the correlator 12a of FIG. 5, two additional 1H delay means 13a and 13b to produce the necessary delayed signals from the difference signal output from the subtractor 8d. The operation of the correlator 12b is the same as the operation of the correlator 12a, so a description will be omitted.

In a moving picture, the horizontal and vertical correlation conditions will differ from one frame to the next, and the horizontal and vertical correlation conditions in the one-frame difference signal will differ from the horizontal and vertical correlation conditions in either of the two frames whose difference is taken. Since it is the filtering of the one-frame difference signal that is being selected by the switch 11c, it is preferable that the selection be controlled according to horizontal and vertical correlation conditions in that signal. That is, the output of the correlator 12b in the motion detector 7b in FIG. 7 reflects conditions in the difference signal output by the subtractor 8d more accurately than does the output of the correlator 12a in the two-dimensional adaptive filter 5.

Next, the operation of motion detector 7c in FIG. 8 will be described. The description will be restricted to differences from motion detector 7a in FIG. 6.

The low-pass filters 10h, 10i, and 10j have, for example, the same transfer functions $L_H(Z)$, $L_V(Z)$, and $L_{HV}(Z)$ as the low-pass filters 10e, 10f, and 10g in FIG. 6. The low-pass filters 10h, 10i, and 10j in FIG. 8, however, operate on the composite video signal 102, as does the correlator 12a that creates the correlation signal 107. Thus the outputs of the low-pass filters 10h, 10i, and 10j are selected according to vertical and horizontal correlations in the signal actually input to the low-pass filters 10h, 10i, and 10j.

The output of the switch 11d is delayed by the 1 F delay means 3c and a one-frame difference signal is obtained by the subtractor 8f. The difference between FIGS. 6 and 8 is that the order of the filtering operation and the one-frame difference operation has been reversed. This does not alter the final result, but the order in FIG. 8 is preferable when the correlation signal 107 is used to select the filter output.

Next the operation of motion detector 7d will be described, again concentrating on the differences from FIG. 6. Referring to FIG. 9, this motion detector uses bandpass filters 10k, 10l, and 10m with, for example, the following transfer functions:

HBPF 10k: $B_H(Z) = (1 - 4Z^{-2} + 6Z^{-4} - 4Z^{-6} + Z^{-8})/16$
VBPF 10l: $B_V(Z) = (-1 + 2Z^{-L} - Z^{-2L})/4$
HVBPF 10m: $B_{HV}(Z) = (2 + 4Z^{-2} - 3Z^{-4} - 20Z^{-6} +$ $$34Z^{-8} - 20Z^{-10} - 3Z^{-12} + 4Z^{-14} + 2Z^{-16}) \cdot$$

$$(-1 + 2Z^{-L} - Z^{-2L})/256$$

The filter selection rule is similar to the one in FIG. 6: the horizontal bandpass filter 10k is selected if horizontal correlation is strong; the vertical bandpass filter 10l is selected if horizontal correlation is weak but vertical correlation is strong; and the horizontal and vertical bandpass filter 10m is selected if horizontal and vertical correlation are both weak. As in FIGS. 12A to 12D, this selection rule enables the selected filter to reject substantially all luminance difference information and pass substantially all chrominance difference information. When the selected chrominance difference signal is subtracted by the subtractor 8g from the difference signal input to the bandpass filters, the desired luminance difference signal is left for input to the absolute-value circuit 21a.

Next the operation of motion detector 7e will be described. Referring to FIG. 10, this example combines the features of motion detectors 7b and 7d in FIGS. 7 and 9. As in FIG. 7, the correlator 12b that controls the filter switching operates on the same one-frame difference signal as the filters themselves. As in FIG. 9, these filters are a horizontal bandpass filter 10k, vertical bandpass filter 10l, and horizontal and vertical bandpass filter 10m that extract chrominance difference information. The selected bandpass filter output is subtracted from the one-frame difference signal as in FIG. 9 to obtain a luminance difference signal for input to the absolute-value circuit 21a.

Next the operation of motion detector 7f will be described. Referring to FIG. 11, this example combines the features of the FIGS. 8 and 9. The bandpass filters 10n, 10o, and 10p have, for example, the same transfer functions $B_H(Z)$, $B_V(Z)$, and $B_{HV}(Z)$ as the bandpass filters 10k, 10l, and 10m in FIG. 9, and they are selected by the same rule. As in FIG. 8, the selection is made according to correlation in the composite video signal 102 input to the filters. The selected filter provides a filtered chrominance signal, which is subtracted by the subtractor 8g from the composite video signal 102 to produce a filtered luminance signal. The 1F delay means 3d and subtractor 8h then produce a luminance difference signal as did the 1 F delay means 3c and subtractor 8f in FIG. 8.

Once the value of K (the motion signal 109) has been determined by one of the motion detectors 7a to 7f in FIGS. 6 to 11, in the first embodiment it is used to create a chrominance signal C by the formula $$C = K \cdot C_M + (1-K) \cdot C_S$$

given above, and this chrominance signal C is subtracted by the subtractor 8a from the composite video signal 102 to obtain the luminance signal output at the luminance output terminal 2a.

The more accurate chrominance-luminance separation achieved by the two-dimensional adaptive filter 5 improves the quality of the $C_M$ signal in all parts of the picture, bringing it closer to the high quality of the $C_S$ signal in stationary parts. Accordingly, overall picture quality is improved, and in particular there is less difference in quality between moving parts of the picture (where K is close to unity), and stationary parts (where K is close to zero).

In the second embodiment, the chrominance signal C is obtained in the same way as in the first embodiment, but the luminance signal Y is obtained differently. Referring again to FIG. 2, the first subtractor 8b subtracts the first chrominance signal 106 from the composite video signal 102 to create a luminance signal $Y_M$. The second subtractor 8c subtracts the second chrominance signal 108 from the composite video signal 102 to create a luminance signal $Y_S$. The mixer 9b then mixes $Y_M$ and $Y_S$ in proportions determined by the motion signal 109 (K) to create the luminance signal Y output at the luminance output terminal 2a. The output luminance signal Y can be expressed as follows:

$$Y = K \cdot Y_M + (1-K) \cdot Y_S (0 \leq K \leq 1)$$

Further simple calculations, which will be omitted, show that the output luminance signal Y obtained in this way is identical to the output luminance signal obtained in the first embodiment.

The third embodiment operates in the same way as the second embodiment except for the addition of the horizontal bandpass filter 10a and switch 11a. The horizontal bandpass filter 10a has, for example, the transfer function:

$$C_B(Z) = (-1 + 4Z^{-2} - 7Z^{-4} + 8Z^{-6} - 7Z^{-8} + 4Z^{-10} - Z^{-12})/32$$

The switch 11a is controlled as follows by the correlation signal 107 output from the two-dimensional adaptive filter 5. When strong correlation is detected only in the vertical direction, the switch 11a selects the first chrominance signal 106 output by the two-dimensional adaptive filter 5. Under other conditions, the switch 11a selects the output of the horizontal bandpass filter 10a. In other words, if the composite video signal has been filtered on at least the horizontal axis in the two-dimensional adaptive filter 5, it is further filtered on the horizontal axis, with a narrower passband, by the horizontal bandpass filter 10a prior to input to the mixer 9a. This narrower filtering eliminates high luminance frequencies more effectively than in the first and second embodiments, thereby further reducing cross color.

This tighter filtering by the horizontal bandpass filter 10a may also eliminate some of the high-frequency components of the chrominance signal, so it is not carried out prior to input of the first chrominance signal 106 to the first subtractor 8b. In this way the third embodiment reduces cross color without the cost of increased cross luminance (that is, without increasing crosstalk of the chrominance signal into the luminance signal).

Figure 14:
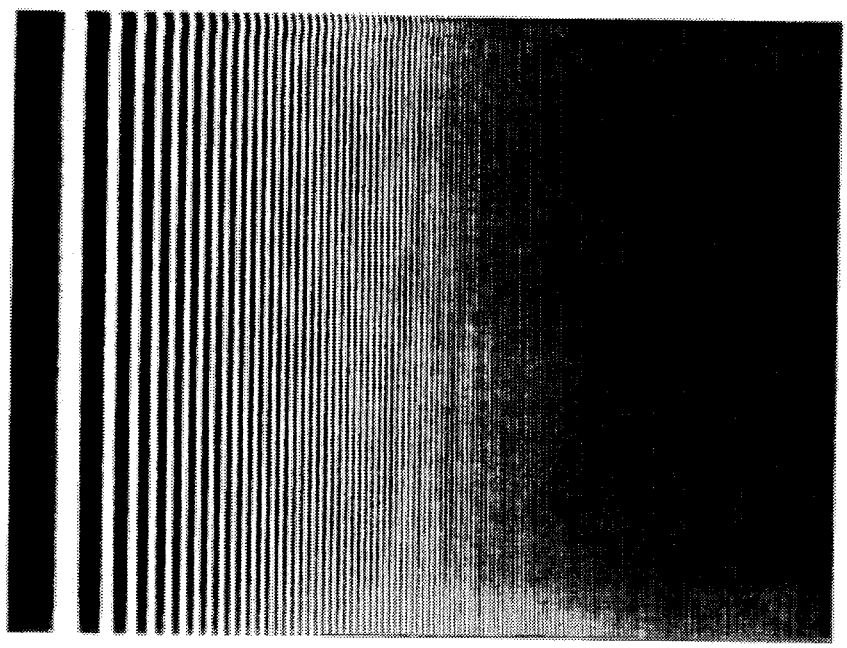
FIG. 14 illustrates a test pattern reproduced using the invented chrominance-luminance separation filter.
Figure 15:
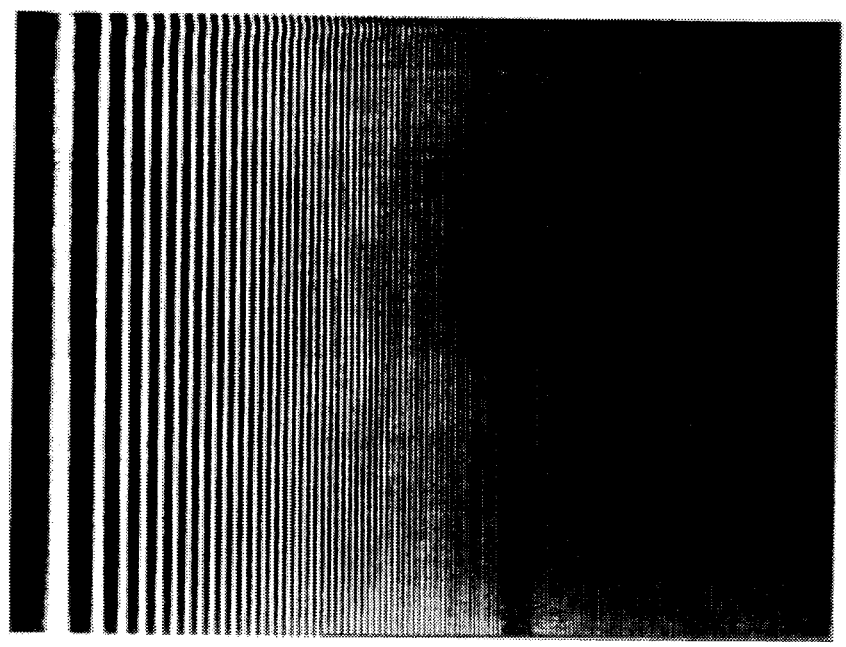
FIG. 15 illustrates the same test pattern reproduced using a conventional chrominance-luminance separation filter.

FIG. 14 shows an example of an image output by the third embodiment. The input signal was an NTSC composite video signal comprising a sweep of horizontal spatial frequencies, and the image was moving in the horizontal direction (the motion, of course, cannot be shown in FIG. 14). FIG. 15 shows the same signal output by a conventional circuit. In FIG. 14 the luminance and chrominance signals have been accurately separated, but in FIG. 15 motion detection has missed high-frequency parts of the luminance signal, leading to cross-color image defects.

In the preceding embodiments, it was implicitly assumed that the composite video signal was sampled at a frequency equal to four times the frequency of the color subcarrier signal, synchronized to the horizontal scanning frequency. This is not a restriction, however. The sampling can be carried out at other frequencies, as long as the sampling points are aligned in the form of a grid on the screen.

The digital filters are not limited to the transfer functions given above. For example, higher-order filters can be used, by adding more 1H and 1F delay means.

The digital filters in the preceding embodiments were finite impulse response filters, but this is not a restriction. Infinite impulse response filters can be used.

Those skilled in the art will recognize that still further modifications can be made to the embodiments without departing from the scope of the invention as claimed below.

What is claimed is:

1. A method of separating a chrominance signal from a luminance signal in a composite video signal in which said chrominance signal is superimposed on a high-frequency region of said luminance signal, comprising the steps of:
   (a) detecting spatial correlation of said composite video signal along at least one axis;
   (b) bandpass-filtering said composite video signal on one of only a horizontal axis and at least a vertical axis selected according to said spatial correlation to obtain a first chrominance signal;
   (c) comb-filtering said composite video signal on a time axis to obtain a second chrominance signal;
   (d) detecting a degree of motion in said composite video signal; and
   (e) mixing said first chrominance signal and said second chrominance signal in proportion to the degree of motion detected in said step (d) to obtain an output chrominance signal.

2. The method of claim 1, comprising the further step of:
   (f) subtracting said output chrominance signal from said composite video signal to obtain an output luminance signal.

3. The method of claim 1, comprising the further steps of:
   (f) subtracting said first chrominance signal from said composite video signal to obtain a first luminance signal;
   (g) subtracting said second chrominance signal from said composite video signal to obtain a second luminance signal; and
   (h) mixing said first luminance signal and said second luminance signal in proportion to the degree of motion detected in said step (d) to obtain an output luminance signal.

4. The method of claim 3, comprising the further step, carried out if and only if said composite video signal was bandpass-filtered on at least said horizontal axis in said step (b), of:
   (i) bandpass-filtering said first chrominance signal on said horizontal axis prior to mixing in said step (e), but not prior to mixing in said step (h), with a narrower passband than in said step (b).

5. The method of claim 1, wherein said step (d) of detecting motion comprises the further steps of:
   delaying said composite video signal by two frame intervals to obtain a two-frame delayed signal;
   taking a difference between said composite video signal and said two-frame delayed signal to obtain a first difference signal; and
   taking an absolute value of said first difference signal to obtain a first absolute value.

6. The method of claim 5, wherein said step (d) of detecting motion comprises the further steps of:
   delaying said composite video signal by one frame interval to obtain a one-frame delayed signal;
   taking a difference between said composite video signal and said one-frame delayed signal to obtain a second difference signal;
   low-pass-filtering said second difference signal on one of said horizontal axis, said vertical axis, and both said horizontal axis and said vertical axis according to said spatial correlation to obtain a luminance difference signal;
   taking an absolute value of said luminance difference signal to obtain a second absolute value; and
   selecting a larger of said first absolute value and said second absolute value.

7. The method of claim 5, wherein said step (d) of detecting motion comprises the further steps of:
   delaying said composite video signal by one frame interval to obtain a one-frame delayed signal;
   taking a difference between said composite video signal and said one-frame delayed signal to obtain a second difference signal;
   detecting spatial correlation of said second difference signal along at least one axis;
   low-pass filtering said second difference signal on one of said horizontal axis, said vertical axis, and both said horizontal axis and said vertical axis according to said spatial correlation of said second difference signal to obtain a luminance difference signal;
   taking an absolute value of said luminance difference signal to obtain a second absolute value; and
   selecting a larger of said first absolute value and said second absolute value.

8. The method of claim 5, wherein said step (d) of detecting motion comprises the further steps of:

low-pass-filtering said composite video signal on one of said horizontal axis, said vertical axis, and both said horizontal axis and said vertical axis according to said spatial correlation detected in said step (a) to obtain a filtered luminance signal;

delaying said filtered luminance signal by one frame interval to obtain a one-frame delayed luminance signal;

taking a difference between said filtered luminance signal and said one-frame delayed luminance signal to obtain a luminance difference signal;

taking an absolute value of said luminance difference signal to obtain a second absolute value; and selecting a larger of said first absolute value and said second absolute value.

9. The method of claim 5, wherein said step (d) of detecting motion comprises the further steps of:

delaying said composite video signal by one frame interval to obtain a one-frame delayed signal;

taking a difference between said composite video signal and said one-frame delayed signal to obtain a second difference signal;

bandpass-filtering said second difference signal on one of said horizontal axis, said vertical axis, and both said horizontal axis and said vertical axis according to said spatial correlation detected in said step (a) to obtain a chrominance difference signal;

subtracting said chrominance difference signal from said second difference signal to obtain a luminance difference signal;

taking an absolute value of said luminance difference signal to obtain a second absolute value; and selecting a larger of said first absolute value and said second absolute value.

10. The method of claim 5, wherein said step (d) of detecting motion comprises the further steps of:

delaying said composite video signal by one frame interval to obtain a one-frame delayed signal;

taking a difference between said composite video signal and said one-frame delayed signal to obtain a second difference signal;

detecting spatial correlation of said second difference signal along at least one axis;

bandpass-filtering said second difference signal on one of said horizontal axis, said vertical axis, and both said horizontal axis and said vertical axis according to said spatial correlation of said second difference signal to obtain a chrominance difference signal;

subtracting said chrominance difference signal from said second difference signal to obtain a luminance difference signal;

taking an absolute value of said luminance difference signal to obtain a second absolute value; and selecting a larger of said first absolute value and said second absolute value.

11. The method of claim 5, wherein said step (d) of detecting motion comprises the further steps of:

bandpass-filtering said composite video signal on one of said horizontal axis, said vertical axis, and both said horizontal axis and said vertical axis according to said spatial correlation detected in said step (a) to obtain a filtered chrominance signal;

subtracting said filtered chrominance signal from said composite video signal to obtain a filtered luminance signal;

delaying said filtered luminance signal by one frame interval to obtain a one-frame delayed luminance signal;

taking a difference between said filtered luminance signal and said one-frame delayed luminance signal to obtain a luminance difference signal;

taking an absolute value of said luminance difference signal to obtain a second absolute value; and selecting a larger of said first absolute value and said second absolute value.

12. The method of claim 1, wherein said step (b) bandpass filters said composite video signal on one of only said horizontal axis and both said horizontal axis and vertical axis according to said spatial correlation to generate said first chrominance signal.

13. The method of claim 1, wherein said step (b) bandpass filters said composite video signal on one of only said horizontal axis, only said vertical axis, and both said horizontal and said vertical axis according to said spatial correlation to generate said first chrominance signal.

14. The method of claim 1, wherein said step (a) detects whether a horizontal correlation of said composite video signal is one of relatively strong and relatively weak, said relatively strong horizontal correlation being strong relative to said relatively weak horizontal correlation and said relatively weak horizontal correlation being weak relative to said relatively strong horizontal correlation; and said step (b) bandpass-filters said composite video signal on only said horizontal axis if said step (a) detects said relatively strong horizontal correlation.

15. The method of claim 6, wherein said step (a) detects whether a horizontal correlation and a vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said step of low-pass-filtering low-pass-filters said second difference signal on said horizontal axis if said step (a) detects said relatively strong horizontal correlation, on said vertical axis if said step (a) detects said relatively weak horizontal correlation and said relatively strong vertical correlation, and on both said horizontal axis and said vertical axis if said step (a) detects said relatively weak horizontal correlation and said relatively weak vertical correlation.

16. The method of claim 7, wherein said step of detecting said spatial correlation of said second difference signal detects whether a horizontal correlation and a vertical correlation of said second difference signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said step of low-pass-filtering low-pass-filters said second difference signal on said horizontal axis if said step of detecting said spatial correlation of said second difference signal detects said relatively strong horizontal correlation, on said vertical axis if said step of detecting said spatial correlation of said second difference signal detects said relatively weak horizontal correlation and said relatively strong vertical correlation, and on both said horizontal axis and said vertical axis if said step of detecting said spatial correlation of said second difference signal detects said relatively weak horizontal correlation and said relatively weak vertical correlation.

17. The method of claim 8, wherein said step (a) detects whether a horizontal correlation and a vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said step of low-pass-filtering low-pass-filters said composite video signal on said horizontal axis if said step (a) detects said relatively strong horizontal correlation, on said vertical axis if said step (a) detects said relatively weak horizontal correlation and said relatively strong vertical correlation, and on both said horizontal axis and said vertical axis if said step (a) detects said relatively weak horizontal correlation and said relatively weak vertical correlation.

18. The method of claim 9, wherein said step (a) detects whether a horizontal correlation and a vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said step of bandpass-filters bandpass-filters said second difference signal on said horizontal axis if said step (a) detects said relatively strong horizontal correlation, on said vertical axis if said step (a) detects said relatively weak horizontal correlation and said relatively strong vertical correlation, and on both said horizontal axis and said vertical axis if said step (a) detects said relatively weak horizontal correlation and said relatively weak vertical correlation.

19. The method of claim 10, wherein said step of detecting said spatial correlation of said second difference signal detects whether a horizontal correlation and a vertical correlation of said second difference signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said step of bandpass-filtering bandpass-filters said second difference signal on said horizontal axis if said step of detecting said spatial correlation of said second difference signal detects said relatively strong horizontal correlation, on said vertical axis if said step of detecting said spatial correlation of said second difference signal detects said relatively weak horizontal correlation and said relatively strong vertical correlation, and on both said horizontal axis and said vertical axis if said step of detecting said spatial correlation of said second difference signal detects said relatively weak horizontal correlation and said relatively weak vertical correlation.

20. The method of claim 11, wherein said step (a) detects whether a horizontal correlation and a vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said step of bandpass-filtering bandpass-filters said composite video signal on said horizontal axis if said step (a) detects said relatively strong horizontal correlation, on said vertical axis if said step (a) detects said relatively weak horizontal correlation and said relatively strong vertical correlation, and on both said horizontal axis and said vertical axis if said step (a) detects said relatively weak horizontal correlation and said relatively weak vertical correlation.

21. A motion-adaptive chrominance-luminance separation filter for separating a chrominance signal from a luminance signal in a composite video signal in which the chrominance signal is superimposed on a high-frequency region of the luminance signal, comprising:

first delay means for delaying said composite video signal by at least one horizontal scan period to generate a first set of signals with various delays;

second delay means for delaying said composite video signal by at least one frame period to generate a second set of signals with various delays;

a two-dimensional adaptive filter coupled to receive at least one of said first set of signals and said composite video signal, for detecting spatial correlation of said composite video signal along at least one axis and bandpass-filtering said composite video signal on one of only said horizontal axis and at least said vertical axis selected according to said spatial correlation to generate a first chrominance signal;

a frame comb filter coupled to receive at least two signals of said second set of signals, for comb-filtering said composite video signal on a time axis to obtain a second chrominance signal;

a motion detector coupled to receive at least two signals of said second set of signals, for detecting a degree of motion in said composite video signal and generating a motion signal; and a first mixer coupled to mix said first chrominance signal and said second chrominance signal according to said motion signal to generate an output chrominance signal.

22. The motion-adaptive chrominance-luminance separation filter of claim 21, further comprising a subtractor for subtracting said output chrominance signal from said composite video signal, to generate an output luminance signal.

23. The motion-adaptive chrominance-luminance separation filter of claim 16, further comprising:

a first subtractor coupled to subtract said first chrominance signal from said composite video signal to generate a first luminance signal;

a second subtractor for subtracting said second chrominance signal from said composite video signal to generate a second luminance signal; and a second mixer coupled to mix said first luminance signal and said second luminance signal according to said motion signal to generate an output luminance signal.

24. The motion-adaptive chrominance-luminance separation filter of claim 23, further comprising:

a first bandpass filter coupled to filter said first chrominance signal on a certain spatial axis, with a narrower passband than employed on said certain spatial axis in said two-dimensional adaptive filter; and a switch coupled to insert said first bandpass filter in series between said two-dimensional adaptive filter and said first mixer, said switch being responsive to said spatial correlation.

25. The motion-adaptive chrominance-luminance separation filter of claim 24, wherein said certain spatial axis is said horizontal axis.

26. The motion-adaptive chrominance-luminance separation filter of claim 25, wherein said first switch inserts said first bandpass filter in series between said two-dimensional adaptive filter and said first mixer if, and only if, said composite video signal was filtered on at least said horizontal axis in said two-dimensional adaptive filter.

27. The motion-adaptive chrominance-luminance separation filter of claim 21, wherein said two-dimensional adaptive filter comprises:

a first bandpass filter for filtering said composite video signal on said horizontal axis;

a second bandpass filter for filtering said composite video signal on said vertical axis;

a correlator for detecting spatial correlation of said composite video along at least one axis; and a switch coupled to select an output of one of said first bandpass filter and said second bandpass filter according to said spatial correlation.

28. The motion-adaptive chrominance-luminance separation filter of claim 21, wherein said motion detector comprises:

a first subtractor coupled to take a difference between two signals differing by a two-frame delay among said second set of signals and said composite video signal to obtain a first difference signal;

a first absolute-value circuit coupled to take an absolute value of said first difference signal to obtain a first absolute value;

luminance difference signal producing means responsive to at least one of said second set of signals for producing a luminance difference signal, and including filter means filtering one of (i) said composite video signal, (ii) one of said second set of signals, and (iii) a difference between one of (1) said composite video signal and one of said second set of signals and (2) two of said second set of video signals on at least one spatial axis selected according to the spatial correlation of said composite video signal;

a second absolute-value circuit coupled to take an absolute value of said luminance difference signal to obtain a second absolute value; and a maximum selector for selecting a larger of said first absolute value and said second absolute value.

29. The motion-adaptive chrominance-luminance separation filter of claim 28, wherein said luminance difference signal producing means comprises:

a second subtractor coupled to take a difference between two signals differing by a one-frame delay among said second set of signals and said composite video signal to obtain a second difference signal;

a first low-pass filter coupled to filter said second difference signal on said horizontal axis;

a second low-pass filter coupled to filter said second difference signal on said vertical axis;

a third low-pass filter coupled to filter said second difference signal on both said horizontal axis and said vertical axis; and a switch coupled to select one of an output of said first low-pass filter, an output of said second low-pass filter, and an output of said third low-pass filter according to said spatial correlation to obtain said luminance difference signal.

30. The motion-adaptive chrominance-luminance separation filter of claim 28, wherein said luminance difference signal producing means comprises:

a second subtractor coupled to take a difference between two signals differing by a one-frame delay among said second plurality of signals and said composite video signal to obtain a second difference signal;

a correlator coupled to detect a spatial correlation of said second difference signal along at least one axis;

a first low-pass filter coupled to filter said second difference signal on said horizontal axis;

a second low-pass filter coupled to filter said second difference signal on said vertical axis;

a third low-pass filter coupled to filter said second difference signal on both said horizontal axis and said vertical axis; and a switch coupled to select an output of said first low-pass filter, an output of said second low-pass filter, and an output of said third low-pass filter according to said spatial correlation detected by said correlator to obtain said luminance difference signal.

31. The motion-adaptive chrominance-luminance separation filter of claim 28, wherein said luminance difference signal producing means comprises:

a first low-pass filter coupled to filter one of said composite video signal and one of said second set of signals on said horizontal axis;

a second low-pass filter coupled to filter said one of said composite video signal and one of said second set of signals on said vertical axis;

a third low-pass filter coupled to filter said one of said composite video signal and one of said second set of signals on both said horizontal axis and said vertical axis;

a switch coupled to select one of an output of said first low-pass filter, an output of said second low-pass filter, and an output of said third low-pass filter to obtain a filtered luminance signal;

delay means coupled to delay said filtered luminance signal to obtain a delayed luminance signal; and a subtractor coupled to take a difference between said filtered luminance signal and said delayed luminance signal to obtain said luminance difference signal.

32. The motion-adaptive chrominance-luminance separation filter of claim 28, wherein said luminance difference signal producing means comprises:

a second subtractor coupled to take a difference between two signals differing by a one-frame delay among said second set of signals and said composite video signal to obtain a second difference signal;

a first bandpass filter coupled to filter said second difference signal on said horizontal axis;

a second bandpass filter coupled to filter said second difference signal on said vertical axis;

a third bandpass filter coupled to filter said second difference signal on both said horizontal axis and said vertical axis;

a switch coupled to select one of an output of said first bandpass filter, an output of said second bandpass filter, and an output of said third bandpass filter according to said spatial correlation to obtain a chrominance difference signal; and a third subtractor coupled to subtract said chrominance difference signal from said second difference signal to obtain said luminance difference signal.

33. The motion-adaptive chrominance-luminance separation filter of claim 28, wherein said luminance difference signal producing means comprises:

a second subtractor coupled to take a difference between two signals differing by a one-frame delay among said second set of signals and said composite video signal to obtain a second difference signal;

a correlator coupled to detect spatial correlation of said second difference signal along at least one axis;

a first bandpass filter coupled to filter said second difference signal on said horizontal axis;

a second bandpass filter coupled to filter said second difference signal on said vertical axis;

a third bandpass filter coupled to filter said second difference signal on both said horizontal axis and said vertical axis;

a switch coupled to select one of an output of said first bandpass filter, an output of said second bandpass filter, and an output of said third bandpass filter according to said spatial correlation of said second difference signal to obtain a chrominance difference signal; and a third subtractor coupled to subtract said chrominance difference signal from said second difference signal to obtain said luminance difference signal.

34. The motion-adaptive chrominance-luminance separation filter of claim 28, wherein said luminance difference signal producing means comprises:

a first bandpass filter coupled to filter one of said composite video signal and one of said second set of signals on said horizontal axis;

a second bandpass filter coupled to filter said one of said composite video signal and one of said second set of signals on said vertical axis;

a third bandpass filter coupled to filter said one of said composite video signal and one of said second set of signals on both said horizontal axis and said vertical axis;

a switch coupled to select one of an output of said first bandpass filter, an output of said second bandpass filter, and an output of said third bandpass filter according to said spatial correlation to obtain a filtered chrominance signal;

a second subtractor coupled to subtract said filtered chrominance signal from said composite video signal to obtain a filtered luminance signal;

delay means coupled to delay said filtered luminance signal to obtain a delayed luminance signal; and a third subtractor coupled to take a difference between said filtered luminance signal and said delayed luminance signal to obtain said luminance difference signal.

35. The motion-adaptive chrominance-luminance separation filter of claim 21, wherein said two-dimensional adaptive filter bandpass-filters said composite video signal on one of only said horizontal axis and both said horizontal axis and vertical axis according to said spatial correlation to generate said first chrominance signal.

36. The motion-adaptive chrominance-luminance separation filter of claim 21, wherein said two-dimensional adaptive filter bandpass-filters said composite video signal on one of only said horizontal axis, only said vertical axis, and both said horizontal and said vertical axis according to said spatial correlation to generate said first chrominance signal.

37. The method of claim 12, wherein said step (a) detects whether a horizontal correlation of said composite video signal is one of relatively strong and relatively weak, said relatively strong horizontal correlation being strong relative to said relatively weak horizontal correlation and said relatively weak horizontal correlation being weak relative to said relatively strong horizontal correlation; and said step (b) bandpass-filters said composite video signal on only said horizontal axis if said step (a) detects said relatively strong horizontal correlation.

38. The method of claim 13, wherein said step (a) detects whether a horizontal correlation and a vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said step (b) bandpass-filters said composite video signal on only said horizontal axis if said step (a) detects said relatively strong horizontal correlation, on said vertical axis if said step (a) detects said relatively weak horizontal correlation and said relatively strong vertical correlation, and on both said horizontal axis and said vertical axis if said step (a) detects said relatively weak horizontal correlation and said relatively weak vertical correlation.

39. The motion-adaptive chrominance-luminance separation filter of claim 21, wherein said two-dimensional adaptive filter detects whether a horizontal correlation of said composite video signal is one of relatively strong and relatively weak, said relatively strong horizontal correlation being strong relative to said relatively weak horizontal correlations, and said relatively weak horizontal correlation being weak relative to said relatively strong horizontal correlation; and said two-dimensional adaptive filter bandpass-filters said composite video signal on only said horizontal axis if said step (a) detects said relatively strong horizontal correlation.

40. The motion-adaptive chrominance-luminance separation filter of claim 35, wherein said two-dimensional adaptive filter detects whether a horizontal correlation of said composite video signal is one of relatively strong and relatively weak, said relatively strong horizontal correlation being strong relative to said relatively weak horizontal correlations, and said relatively weak horizontal correlation being weak relative to said relatively strong horizontal correlation; and said two-dimensional adaptive filter bandpass-filters said composite video signal on only said horizontal axis if said step (a) detects said relatively strong horizontal correlation.

41. The motion-adaptive chrominance-luminance separation filter of claim 36, wherein said two-dimensional filter detects whether a horizontal correlation and a vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said two-dimensional adaptive filter bandpass-filters said composite video signal on only said horizontal axis if said step (a) detects said relatively strong horizontal correlation, on only said vertical axis if said step (a) detects said relatively weak horizontal correlation and said relatively strong vertical correlation, and on both said horizontal axis and said vertical axis if said step (a) detects said relatively weak horizontal correlation and said relatively weak vertical correlation.

42. The motion-adaptive chrominance-luminance separation filter of claim 27, wherein said correlator detects whether a horizontal correlation of said composite video signal is one of relatively strong and relatively weak, said relatively strong horizontal correlation being strong relative to said relatively weak horizontal correlation and said relatively weak horizontal correlation being weak relative to said relatively strong horizontal correlation; and said switch selects said output of said first bandpass filter if said correlator detects said relatively strong horizontal correlation.

43. The motion-adaptive chrominance-luminance separation filter of claim 29, wherein said two-dimensional adaptive filter detects whether a horizontal correlation and a vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said switch selects said output of said first low-pass filter when said horizontal correlation is relatively strong, said output of said second low-pass filter when said horizontal correlation is relatively weak and said vertical correlation is relatively strong, and said output of said third low-pass filter when said horizontal and vertical correlations are relatively weak.

44. The motion-adaptive chrominance-luminance separation filter of claim 30, wherein said correlator detects whether a horizontal correlation and a vertical correlation of said second difference signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said switch selects said output of said first low-pass filter when said horizontal correlation is relatively strong, said output of said second low-pass filter when said horizontal correlation is relatively weak and said vertical correlation is relatively strong, and said output of said third low-pass filter when said horizontal and vertical correlations are relatively weak.

45. The motion-adaptive chrominance-luminance separation filter of claim 31, wherein said two-dimensional adaptive filter detects whether a horizontal correlation and a vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said switch selects said output of said first low-pass filter when said horizontal correlation is relatively strong, said output of said second low-pass filter when said horizontal correlation is relatively weak and said vertical correlation is relatively strong, and said output of said third low-pass filter when said horizontal and vertical correlations are relatively weak.

46. The motion-adaptive chrominance-luminance separation filter of claim 32, wherein said two-dimensional adaptive filter detects whether a horizontal correlation and a vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said switch selects said output of said first bandpass filter when said horizontal correlation is relatively strong, said output of said second bandpass filter when said horizontal correlation is relatively weak and said vertical correlation is relatively strong, and said output of said third bandpass filter when said horizontal and vertical correlations are relatively weak.

47. The motion-adaptive chrominance-luminance separation filter of claim 33, wherein said correlator detects whether a horizontal correlation and a vertical correlation of said second difference signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said switch selects said output of said first bandpass filter when said horizontal correlation is relatively strong, said output of said second bandpass filter when said horizontal correlation is relatively weak and said vertical correlation is relatively strong, and said output of said third bandpass filter when said horizontal and vertical correlations are relatively weak.

48. The motion-adaptive chrominance-luminance separation filter of claim 34, wherein said two-dimensional adaptive filter detects whether a horizontal correlation and a vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said switch selects said output of said first bandpass filter when said horizontal correlation is relatively strong, said output of said second bandpass filter when said horizontal correlation is relatively weak and said vertical correlation is relatively strong, and said output of said third bandpass filter when said horizontal and vertical correlations are relatively weak.

49. A method of separating a chrominance signal from a luminance signal in a composite video signal in which said chrominance signal is superimposed on a high-frequency region of said luminance signal, comprising the steps of:

(a) detecting a horizontal correlation and a vertical correlation of said composite video signal;

(b) bandpass-filtering said composite video signal on at least one of only a vertical axis and both a horizontal axis and said vertical axis according to said horizontal and vertical correlations to obtain a first chrominance signal;

(c) comb-filtering said composite video signal on a time axis to obtain a second chrominance signal;

(d) detecting a degree of motion in said composite video signal; and (e) mixing said first chrominance signal and said second chrominance signal in proportion to the degree of motion detected in said step (d) to obtain an output chrominance signal.

50. The method of claim 49, wherein said step (a) detects whether said horizontal correlation and said vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said step (b) bandpass-filters said composite video signal on said vertical axis when said horizontal correlation is relatively weak and said vertical correlation is relatively strong, and on both said horizontal axis and said vertical axis when said horizontal and vertical correlations are relatively weak.

51. A motion-adaptive chrominance-luminance separation filter for separating a chrominance signal from a luminance signal in a composite video signal in which the chrominance signal is superimposed on a high-frequency region of the luminance signal, comprising:

first delay means for delaying said composite video signal by at least one horizontal scan period to generate a first set of signals with various delays;

second delay means for delaying said composite video signal by at least one frame period to generate a second set of signals with various delays;

a two-dimensional adaptive filter coupled to receive said first set of signals and said composite video signal, for detecting a horizontal correlation and a vertical correlation of said composite video signal, and for bandpass-filtering said composite video signal on at least one of a vertical axis and both a horizontal axis and said vertical axis according to said horizontal and vertical correlations to generate a first chrominance signal;

a frame comb filter, coupled to receive at least two signals of said second set of signals, for comb-filtering said composite video signal on a time axis to obtain a second chrominance signal;

a motion detector, coupled to receive at least two signals of said second set of signals, for detecting a degree of motion in said composite video signal and generating a motion signal; and a first mixer, coupled to mix said first chrominance signal and said second chrominance signal according to said motion signal to generate an output chrominance signal.

52. The method of claim 51, wherein said two-dimensional adaptive filter detects whether said horizontal correlation and said vertical correlation of said composite video signal are one of relatively strong and relatively weak, said relatively strong horizontal and vertical correlations being strong relative to said relatively weak horizontal and vertical correlations, respectively, and said relatively weak horizontal and vertical correlations being weak relative to said relatively strong horizontal and vertical correlations, respectively; and said two-dimensional adaptive filter bandpass-filters said composite video signal on said vertical axis when said horizontal correlation is relatively weak and said vertical correlation is relatively strong, and on both said horizontal axis and said vertical axis when said horizontal and vertical correlations are relatively weak.

* * * * *

UNITED STATES PATENT AND TRADEMARK OFFICE
CERTIFICATE OF CORRECTION

PATENT NO. : 5,502,509

DATED : March 26, 1996

INVENTOR(S) : Takuji Kurashita et al

It is certified that error appears in the above-indentified patent and that said Letters Patent is hereby corrected as shown below:

Column 9

Line 67, change "DH2.K5" to --DH2·K5--

Column 10

Line 21, change "DV2.KS" to --DV2·K5-- and "DV2.K6" to --DV2·K6--

Column 11

Line 59, change "$C_H(Z).C_V(Z)$" to --$CH(Z)·C_V(Z)$--.

Column 13

Line 45, change "$C=K.C_M+(1-K).C_s$" to --$C=K·C_M+(1-K)·C_s$--

Column 16

Line 25, change "$C=K.C_M+(1-K).C_s$" to --$C=K·C_M+(1-K)·C_s$--

Line 51, change "$Y=K.Y_M+(1-K).Y_s$" to --$Y=K·Y_M+(1-K)·Y_s$--

UNITED STATES PATENT AND TRADEMARK OFFICE
CERTIFICATE OF CORRECTION

PATENT NO. : 5,502,509
DATED : March 26, 1996
INVENTOR(S) : Takuji Kurashita et al It is certified that error appears in the above-indentified patent and that said Letters Patent is hereby corrected as shown below:

<u>Column 12</u>

Line 35, change "max {K1.DCH, K2.DYH}" to --max {K1·DCH, K2·DYH}--

Line 36, change "max {K9.DCH, K10.DYH}" to --max {K9·DCH, K10·DYH}--

Line 37, change "max {K3.DCV, K4.DYV}" to --max {K3·DCV, K4·DYV}--

Line 38, change "max {K7.DCV, K8.DYV}" to --max {K7·DCV, K8·DYV}--

Line 44, change "K5.DH2" to --K5·DH2-- and "K6.DV2" to --K6·DV2--

Line 50, change "K5.DH2" to --K5·DH2-- and "K6.DV2" to --K6·DV2--

Line 53, change "K5.DH2" to --K5·DH2-- and "K6.DV2" to --K6·DV2--

Line 56, change "K5.DH2" to --K5·DH2-- and "K6.DV2" to --K6·DV2--

Signed and Sealed this

Twelfth Day of November, 1996

*Attest:*

BRUCE LEHMAN

*Attesting Officer*   *Commissioner of Patents and Trademarks*